(12) United States Patent
Senske

(10) Patent No.: US 12,007,772 B2
(45) Date of Patent: Jun. 11, 2024

(54) AUTONOMOUS BAGGAGE DEVICE

(71) Applicant: Efficient Technologies, Inc., Lincoln, NE (US)

(72) Inventor: Matthew Senske, Lincoln, NE (US)

(73) Assignee: EFFICIENT TECHNOLOGIES, INC., Lincoln, NE (US)

( * ) Notice: Subject to any disclaimer, the term of this patent is extended or adjusted under 35 U.S.C. 154(b) by 913 days.

(21) Appl. No.: 17/014,903

(22) Filed: Sep. 8, 2020

(65) Prior Publication Data

US 2021/0072754 A1 Mar. 11, 2021

Related U.S. Application Data

(60) Provisional application No. 62/896,482, filed on Sep. 5, 2019.

(51) Int. Cl.
| | |
|---|---|
| *G05D 1/02* | (2020.01) |
| *B60P 1/36* | (2006.01) |
| *B60P 3/00* | (2006.01) |
| *B65G 67/20* | (2006.01) |
| *G05D 1/00* | (2006.01) |
| *G06K 7/10* | (2006.01) |
| *G06K 7/14* | (2006.01) |

(52) U.S. Cl.
CPC .............. *G05D 1/0212* (2013.01); *B60P 1/36* (2013.01); *B60P 3/00* (2013.01); *B65G 67/20* (2013.01); *B65G 2201/0235* (2013.01); *B65G 2203/0216* (2013.01); *G06K 7/10366* (2013.01); *G06K 7/1413* (2013.01)

(58) Field of Classification Search
CPC . G05D 1/0212; B60P 1/36; B60P 3/00; B65G 67/20; B65G 2203/0216; G06K 7/10366; G06K 7/1413

See application file for complete search history.

(56) References Cited

U.S. PATENT DOCUMENTS

| | | | |
|---|---|---|---|
| 3,066,817 | A | 12/1962 | Bradshaw et al. |
| 3,885,682 | A | 5/1975 | Mcwilliams |
| 4,711,357 | A | 12/1987 | Angenbeck et al. |
| 6,431,346 | B1 | 8/2002 | Gilmore et al. |
| 6,708,814 | B2 | 3/2004 | Wagstaffe |

(Continued)

FOREIGN PATENT DOCUMENTS

| | | |
|---|---|---|
| CN | 104875796 A | 9/2015 |
| EP | 3208198 A1 | 8/2017 |

(Continued)

OTHER PUBLICATIONS

PCT International Search Report and Written Opinion for International Application No. PCT/US2020/49765 dated Jan. 26, 2021, 13 pages.

(Continued)

*Primary Examiner* — Kyle O Logan
(74) *Attorney, Agent, or Firm* — Suifer Swantz IP

(57) ABSTRACT

A device is disclosed. The device includes an exterior conveyor and a storage area. The exterior conveyor is configured to convey baggage to and from the storage area. The baggage may be sorted to the storage area by a lateral sorter and a vertical sorter. The baggage be conveyed from a front of the storage area to a rear of the storage area by a storage area conveyor.

30 Claims, 18 Drawing Sheets

(56) References Cited

U.S. PATENT DOCUMENTS

| | | |
|---|---|---|
| 6,837,359 B1 | 1/2005 | Bessette |
| 9,676,561 B1 | 6/2017 | Snook |
| 10,894,664 B1* | 1/2021 | Brady .................. B65G 1/1378 |
| 2008/0232941 A1 | 9/2008 | Goor et al. |
| 2012/0097498 A1 | 4/2012 | Campbell et al. |
| 2014/0241837 A1 | 8/2014 | Bartelet |
| 2018/0050876 A1 | 2/2018 | Hart |
| 2018/0079601 A1* | 3/2018 | Khong .................... B62B 3/005 |
| 2018/0186582 A1 | 7/2018 | Borders et al. |

FOREIGN PATENT DOCUMENTS

| | | |
|---|---|---|
| WO | 2004071868 A1 | 8/2004 |
| WO | 2006098617 A1 | 9/2006 |

OTHER PUBLICATIONS

Extended European Search Report dated Jul. 20, 2023; European Application No. 20860705.1.

\* cited by examiner

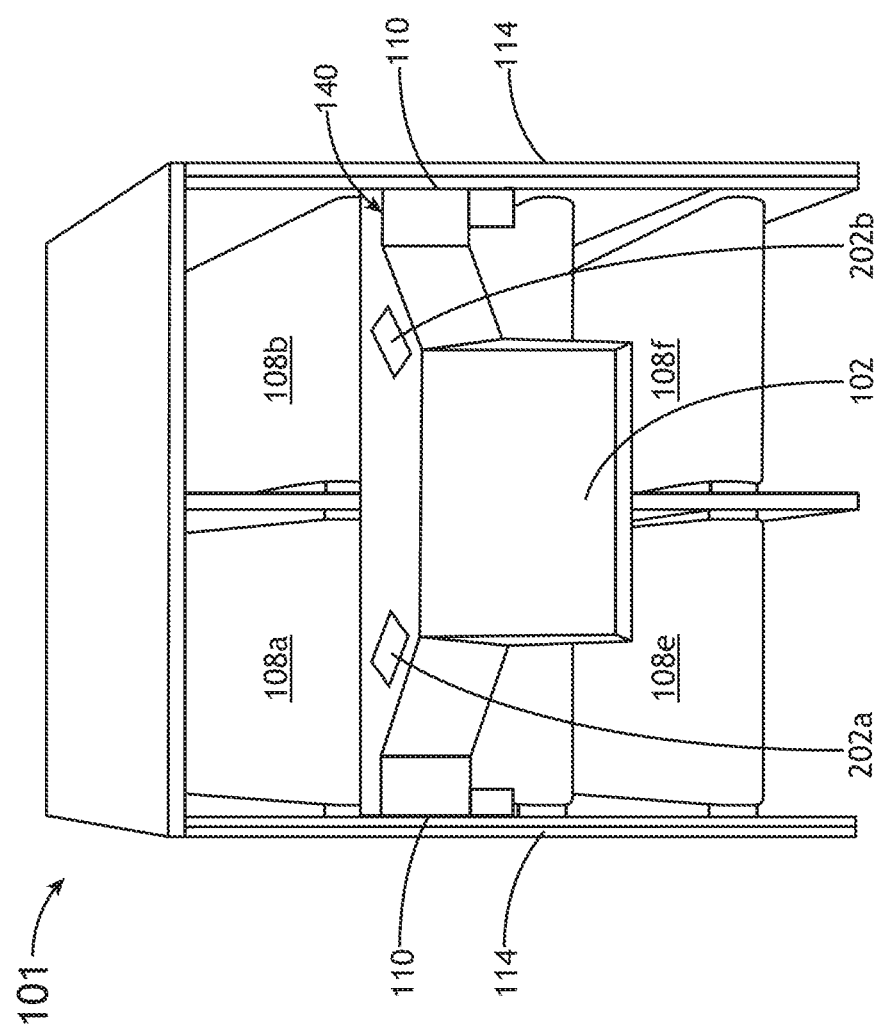

AUTONOMOUS BAGGAGE DEVICE

CROSS-REFERENCE TO RELATED APPLICATION

The present application claims the benefit under 35 U.S.C. § 119(e) of U.S. Provisional Application Ser. No. 62/896,482, filed Sep. 5, 2019, which is incorporated herein by reference in their entirety.

TECHNICAL FIELD

The present invention relates to the field of baggage and cargo handling for the airline industry, and more particularly, to a device for automated baggage handling.

BACKGROUND

A passenger checks into an airport terminal with baggage. The terminal takes the passenger's baggage and registers the baggage with a baggage number. The baggage number may be an International Air Transport Association (IATA) baggage identifier with a ten-digit number, the ten-digit number including a leading digit, a three-digit airline code, and a six-digit bag number. The baggage may then be directed to a baggage handling area. The baggage may then be loaded from the baggage handling area onto an airplane by a baggage cart, a baggage tug, and a belt loader. Similarly, the airplane may be unloaded with the baggage cart, the baggage tug, and the belt loader. The baggage cart may require a baggage handler to load and unload baggage. The baggage cart may be loaded and unload from the baggage cart by the belt loader. The belt loader must be placed to receive baggage from the baggage handling area and output the baggage to the baggage cart. The belt loader and the baggage cart must be manually moved between the various airport locations. The belt loader and baggage cart may also provide limited sorting functionality to storage areas on the baggage cart, if any storage areas are even present. This may reduce the airlines knowledge of where a baggage is currently stored.

Therefore, it would be advantageous to provide a device that cures the shortcomings described above.

SUMMARY

A device is disclosed in accordance with one or more illustrative embodiments of the present disclosure. In one illustrative embodiment, the device includes a storage portion. In another illustrative embodiment, the storage portion includes a first storage area, a second storage area, and a third storage area. In another illustrative embodiment, the first storage area is vertically adjacent to the second storage area and horizontally adjacent to the third storage area. In another illustrative embodiment, the first storage area, the second storage area, and the third storage area are configured to receive luggage. In another illustrative embodiment, the device includes an exterior conveyor having a first and a second end. In another illustrative embodiment, the exterior conveyor is configured to convey the baggage from the first end to the second end. In another illustrative embodiment, the device includes a lateral sorter configured to laterally sort the baggage between a number of lateral storage areas. In another illustrative embodiment, the device includes a vertical sorter configured to vertically sort the baggage between a number of vertical storage areas. In another illustrative embodiment, the exterior conveyor is pivotable about a pivotable connection. In another illustrative embodiment, the first end of the exterior conveyor may be selected adjusted by pivoting the exterior conveyor about the pivotable connection. In another illustrative embodiment, the device includes a plurality of wheels configured to support a weight of the storage portion. In another illustrative embodiment, the device includes a propulsion unit connected to the plurality of wheels, the propulsion unit being configured to selectively rotate the wheels. In another illustrative embodiment, the exterior conveyor is connected to the vertical sorter.

BRIEF DESCRIPTION OF THE DRAWINGS

The numerous advantages of the disclosure may be better understood by those skilled in the art by reference to the accompanying figures in which:

FIG. 3B illustrates a perspective view of the baggage storage device, in accordance with one or more embodiments of the present disclosure;

DETAILED DESCRIPTION OF THE INVENTION

Reference will now be made in detail to the subject matter disclosed, which is illustrated in the accompanying drawings.

Referring generally to FIGS. 1-12, a baggage handling system 100, baggage vehicle 101, and a method 800 is disclosed, in accordance with one or more embodiments of the present disclosure.

Embodiments of the present disclosure are directed to a device for loading and unloading baggage from an airplane. The device may include a plurality of storage areas for storing baggage. The storage areas may be loaded with baggage from an airplane or from the ground. The baggage may be conveyed to the storage areas by an exterior conveyor. The baggage may be selectively stored in a storage area of the plurality of storage areas by a vertical sorter and a horizontal sorting mechanism.

Figure 1:
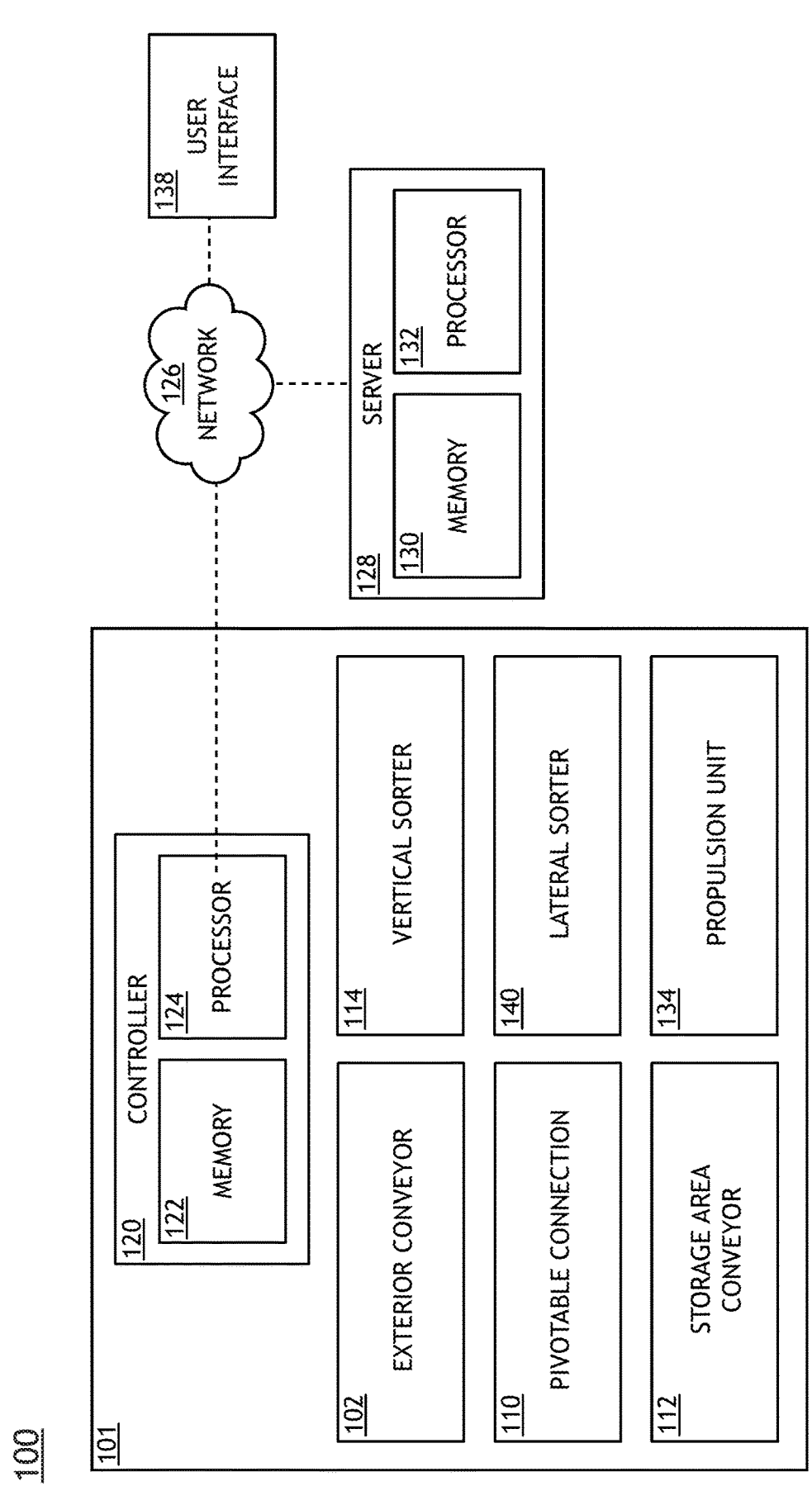
FIG. 1 illustrates a block diagram depicting a controller of a baggage storage system, in accordance with one or more embodiments of the present disclosure.

FIG. 1 illustrates a block diagram of a baggage handling system 100, in accordance with one or more embodiments of the present disclosure.

Figure 2:
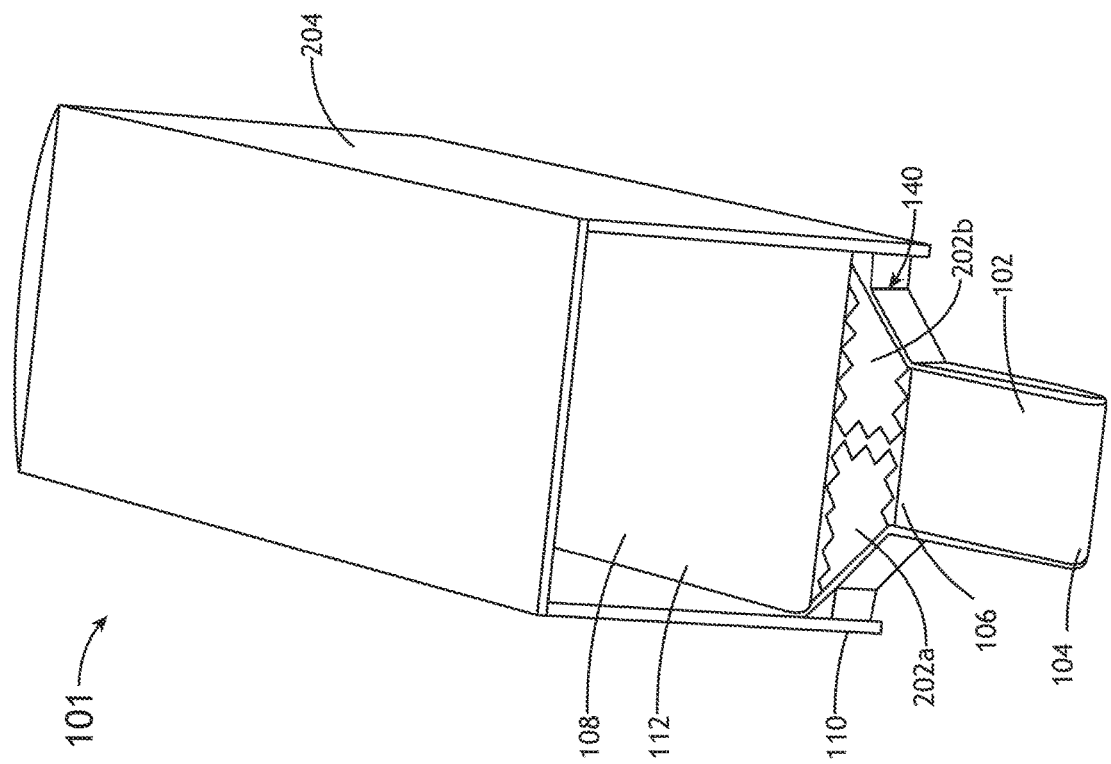
FIG. 2 illustrates a perspective view of a baggage storage device, in accordance with one or more embodiments of the present disclosure.

In embodiments, the baggage handling system 100 includes a baggage vehicle 101. The baggage vehicle 101 includes an exterior conveyor 102. The exterior conveyor 102 may have a first end 104 and a second end 106 (as depicted in FIG. 2). The exterior conveyor 102 may be configured to receive baggage onto the device from an aircraft by the first end 104. The exterior conveyor 102 may be configured to convey the baggage from the first end 104 to the second end 106. Baggage may also be conveyed from the second end 106 and to the first end 104 (e.g., a two-way conveyor). The exterior conveyor 102 may convey the baggage by any suitable mechanism, such as, but not limited to, a conveyor belt, a power roller conveyor, an omni-directional conveyor, or a chain conveyor. The exterior conveyor 102 allows the baggage vehicle 101 to autonomously, semi-autonomously, and/or manually (e.g., by remote control) carry out storing baggage in the baggage vehicle 101.

Figure 3A:
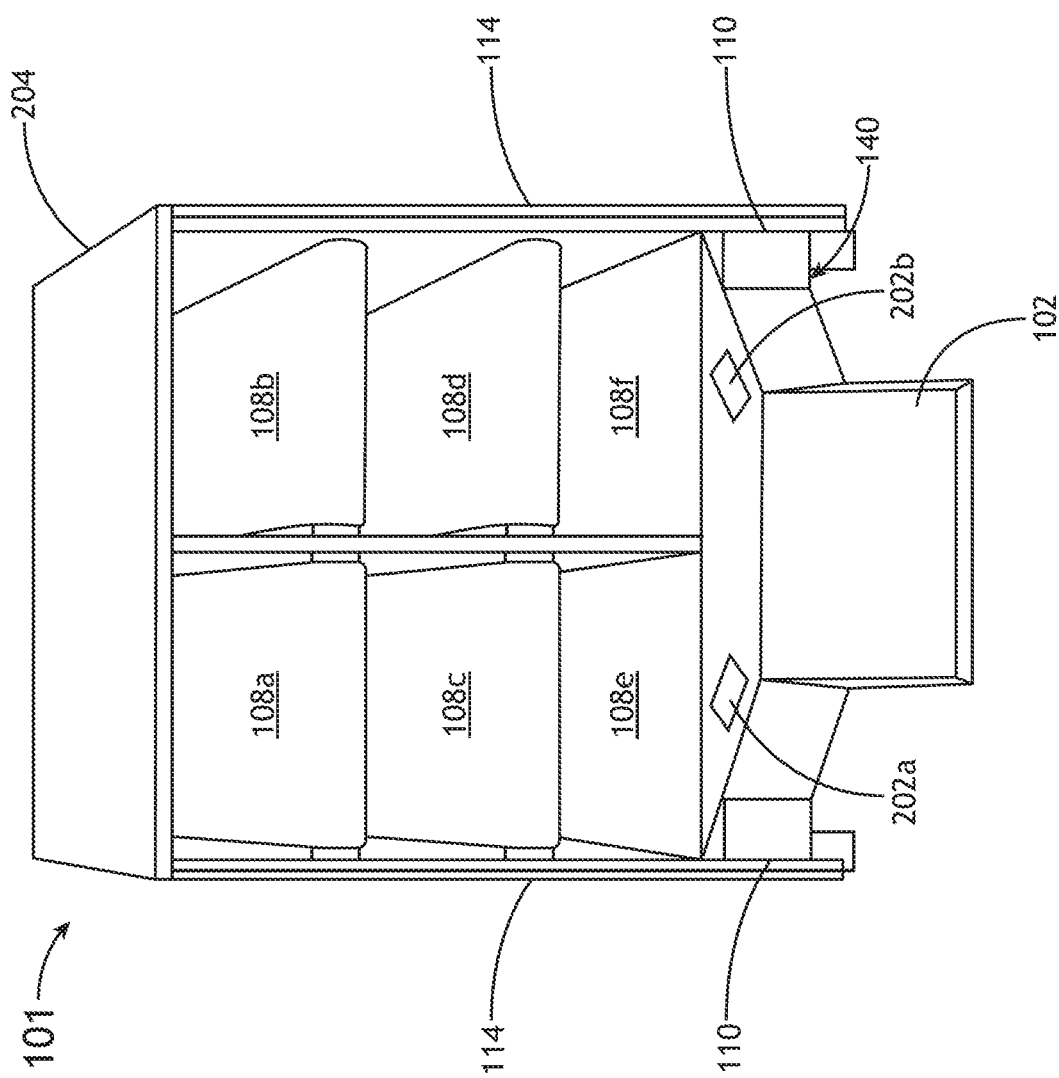
FIG. 3A illustrates a front perspective view of the baggage storage device, in accordance with one or more embodiments of the present disclosure.

The device may include a storage portion 204 with one or more storage areas 108 for storing baggage. For example, the storage portion 204 may include the storage area 108 (as depicted in FIG. 2) or may include a plurality of the storage areas 108a-f (as depicted in FIG. 3A). The storage area(s) 108 may be configured to receive the baggage. In this regard, the storage areas 108 may have one or more walls which may receive baggage to be stored. The baggage vehicle 101 may be configured to convey the baggage from the exterior conveyor 102 to the one or more storage areas by the exterior conveyor or a lateral sorter 140 (e.g., plurality of directional conveyors 202, secondary conveyor 502 connected to horizontal stage 504, diverter, or pusher).

Figure 4A:
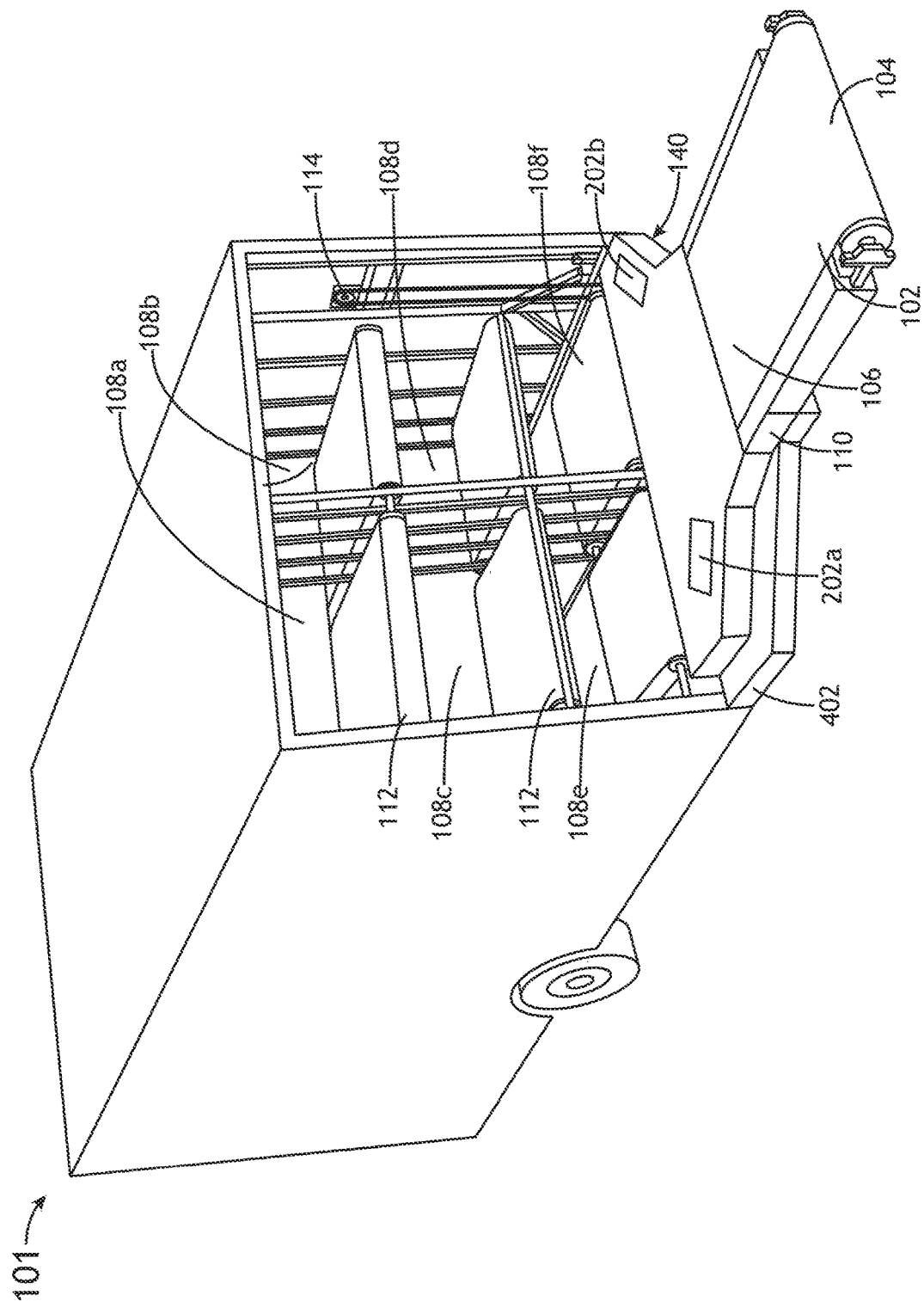
FIG. 4A illustrates a perspective view of the baggage storage device, in accordance with one or more embodiments of the present disclosure.

In embodiments, the exterior conveyor 102 may be configured to pivot about a pivotable connection 110. By pivoting, the first end 104 of the exterior conveyor 102 may be pivoted to a ground position (e.g., at an angle of up to −15 degrees relative to the ground), to an aircraft position (e.g., at an angle of up to 30 degrees relative to the ground), or to a stowed position (e.g., at an angle of 90 degrees relative to the ground). In this regard, the height of the first end 104 may be controlled based on the angle about the pivotable connection 110. The exterior conveyor 102 may be pivoted about the pivot connection 110 in any suitable manner, including, but not limited to, a rotary actuator, linear actuator (e.g., actuator 702 as depicted in FIG. 7), hydraulic lift, a pneumatic lift, or a cable winch. The pivotable connection 110 may be configured on the baggage vehicle 101 in any suitable manner, such as, but not limited to, by pivoting between the lateral sorter 140 and the storage portion 204 (as depicted in FIG. 3A-3B) or by pivoting between the exterior conveyor 102 and a frame 402 connected to the storage portion 204 (as depicted in FIG. 4A).

In embodiments, one or more of the storage areas 108 may include a storage area conveyor 112. The storage area conveyor 112 may be housed within the storage area 108. The storage area conveyor 112 may be disposed along a full length of the storage area 108, for conveying the baggage between the front and the rear of the storage area 108, or disposed along a portion less than the full length. The storage area conveyor 112 may also be engaged in a reverse direction for unloading the baggage from the storage area 108 to the exterior conveyor 102 (e.g., a two-way conveyor). The storage area conveyor 112 may be connected to a controller (e.g., controller 120), in accordance with one or more embodiments of the present disclosure.

In embodiments, the baggage vehicle 101 includes one or more storage areas 108 which are laterally adjacent. For example, the device may include a storage area 108a and a storage area 108b disposed laterally adjacent to the storage area 108a. The baggage vehicle 101 may sort the baggage into the laterally adjacent storage areas 108a, 108b by a lateral sorter 140, such as, but not limited to a plurality of directional conveyors 202 (as depicted in FIGS. 3A-4B), a secondary conveyor 502 connected to a horizontal stage 504 (as depicted in FIGS. 5A-5C), a diverter (not depicted), or a pusher (not depicted).

In embodiments, the baggage vehicle 101 includes one or more storage areas 108 which are vertically adjacent. For example, the baggage vehicle 101 may include a storage area 108a and a storage area 108c disposed below storage area 108a. The baggage vehicle 101 may vertically sort baggage into the storage areas 108a, 108c by a vertical sorter 114 (as depicted in FIGS. 3A-5C).

In embodiments, the baggage vehicle 101 may include a controller 120. The controller 120 may include one or more memory mediums 122 and processors 124, wherein the one or more processors 124 are configured to execute a set of program instructions stored in the memory 122, the set of program instructions configured to cause the one or more processors 124 to carry out one or more steps of the present disclosure. The controller 120 may be configured to control various components of the device, such as, but not limited to, the exterior conveyor 102, the pivotable connection 110, the storage area conveyor 112, a vertical sorter (e.g., vertical sorter 114), a lateral sorter 140 (e.g., a plurality of directional conveyors 202, a secondary conveyor 502 and a horizontal stage 504, a diverter, a pusher, etc.) or the propulsion unit 134.

For example, the controller 120 may control the exterior conveyor 102 for conveying the baggage to and from the storage areas 108. The controller 120 may also determine that the storage area 108 at a first height is full and that the baggage must be stored in a storage area 108 at another height. The controller 120 may control the vertical sorter 114 to sort the baggage into various vertical storage areas 108. The controller 120 may also control the lateral sorter 140 to sort the baggage into various laterally adjacent storage areas 108. The controller 120 may also engage the storage area conveyors 112 to convey the baggage to the rear of the storage area. The controller may also adjust the height and the angle of the exterior conveyor 102, when the exterior conveyor 102 is connected to the vertical sorter 114 (as depicted in FIGS. 3A-3B). As the vertical sorter 114 adjusts the height of the second end 106 of the exterior conveyor 102, the first end 104 is moved a similar amount. The controller 120 may account for this amount and rotate the exterior conveyor 102 about the pivot connection 110 to compensate (e.g., to maintain a connection between the airplane bay and the first end of the conveyor). The controller 120 may further extend or retract a telescoping exterior conveyor 602. The controller 120 may also move the baggage vehicle 101 forwards or backwards by the propulsion unit 134.

In embodiments, the baggage vehicle 101 may be coupled to a user interface 138. A user may use the user interface 138 in order to view baggage stored in the baggage vehicle 101, to set a sorting scheme, or view other information stored by baggage vehicle 101 in the memory 122. It is noted herein that a single electronics device (e.g., a tablet, a personal computer, and the like) may serve both as a controller 120 and as a user interface 138.

In embodiments, the baggage handling system 100 may include a network connection 126 connecting the baggage vehicle 101 to a server 128 including one or more memory medium 130 and processors 132. The network 126 may include network interface circuitry. It is noted that network interface circuitry (not shown) of baggage vehicle 101 may include any network interface device suitable for interfacing with server 128. For example, the network interface circuitry may include wireline-based interface devices (e.g., DSL-based interconnection, cable-based interconnection, T9-based interconnection, and the like). In another embodiment, the network interface circuitry may include a wireless-based interface device employing GSM, GPRS, CDMA, EV-DO, EDGE, WiMAX, 3G, 4G, 4G LTE, 5G, WiFi protocols, RF, LoRa, and the like. By the network interface, a user may access various features of the controller 120, such as, but not limited to, provide the controller 120 with a sorting scheme or view baggage stored by the baggage vehicle 101. The server may also communicate with the baggage vehicle 101 by one or more RF links (e.g., LF, HF, UHF, etc.). The baggage vehicle 101 may also provide status reports to a human operator by one or more display screens (e.g., a number of bags on board or a level of battery charge).

In embodiments, the controller 120 is configured to receive a baggage identifier of the baggage. For example, the baggage may have a baggage tag (e.g., an IATA code) readable by a bar code reader. The bar code may be scanned by the bar code reader and provided to the controller 120. The controller 120 may then identify the baggage by comparing the scanned bar code with a database of known baggage bar codes (e.g., by a connection to the server 128). The controller 120 may then lookup the baggage identifier in the database to determine a flight associated with the baggage. The baggage identifier may also indicate various data, such as, but not limited to, a weight, one or more dimensions, a destination, a color, or an owner of the baggage. Although the controller 120 has been described as receiving the baggage identifier from a bar code reader, this is not intended as a limitation on the present disclosure. In this regard, the controller 120 may receive the baggage identifier from any suitable source, such as, but not limited to an RFID tag reader, a barcode reader, or a visual machine learning algorithm.

In embodiments, the controller 120 is configured to autonomously sort baggage into various storage areas 108 of the baggage vehicle 101. The autonomous sorting may be based on a sorting scheme. The sorting scheme may include one or more factors which are evaluated when sorting the baggage. The sorting scheme may include a factor of the storage area has an open spot for the baggage (e.g., the storage area is not full of other baggage). The sorting scheme may include a factor of at least one of a dimension, weight, or destination of the baggage. The sorting scheme may include a factor of a passenger status of a passenger associated with the baggage (e.g., a first-class customer may receive preferential storage treatment). The sorting scheme may include a factor of a type of the baggage (e.g., breakable baggage may get preferential storage treatment; US mail may be conveyed to a US mail storage area, etc.). The sorting scheme include a factor of a flight delay time of a flight associated with the baggage. The sorting scheme may further be evaluated by a process improvement algorithm (not depicted). The process improvement algorithm may be configured to estimate an optimal storage area of a plurality of storage vehicles based on the baggage flight data and a current baggage status of the plurality of storage vehicles. In this regard, the baggage may be sorted to a storage area to reduce a time until the baggage reaches the airplane and/or the terminal. Based on the sorting scheme, the controller 120 may determine the appropriate storage area 108 and sort the baggage autonomously by the engaging the exterior conveyor 102, the lateral sorter 140, the vertical sorter 114, and the storage area conveyor 112.

The baggage vehicle 101 may include a propulsion unit 134. The propulsion unit 134 may include a motor, such as, but not limited to, a diesel, gasoline combustion, or electric powered motor. The propulsion unit 134 may be configured to move the baggage vehicle 101 by rotating one or more wheels 136 on the device (as depicted in FIG. 2). The wheels 136 may also be selectively steered by a steering system (not depicted). In this regard, the baggage vehicle 101 may be configured to drive to a location (e.g., an airplane bay, baggage handling area, etc.) for loading or unloading the baggage to or from one the storage areas 108 of the baggage vehicle 101 (e.g., by an autonomous sorting by the controller 120, the lateral sorter 140, and the vertical sorter 114). The propulsion unit 134 may be controlled by a baggage handler (e.g., with a steering wheel housed on the baggage vehicle 101) or may be controlled by a controller by an autonomous control.

The wheels 136 may be connected to a load supporting axle (not depicted). The wheels 136 may be disposed on one or more sides of the storage portion 204. In this regard, the baggage vehicle 101 may be configured to roll by the wheels 136. The load supporting axle may be connected to the propulsion unit 134, by a transmission system (not depicted). In this regard, the wheels 136 may be controlled by the propulsion unit 134 to drive the baggage vehicle between one or more areas to receive baggage. The baggage vehicle may further include one or more brakes (not depicted), such as, but not limited to, an electric brake, a pneumatic brake, or a hydraulic brake. In this regard, a movement of the baggage vehicle 101 may be halted by the brakes. The load supporting axle may also be coupled to one or more suspension components (not depicted). For example, the frame 402 may be coupled to the load supporting axle by the one or more suspension components, such as, but not limited to, a bracket, a bearing, a leaf spring, a shock, or a strut. In this regard, the wheels 136 may bear a load of various components of the baggage vehicle 101, such as the storage portion 204 by way of the frame suspension components and the load supporting axle.

In embodiments, the controller 120 is configured to autonomously drive the baggage vehicle 101. The controller 120 may be configured to drive the baggage vehicle 101 by communicating with the propulsion unit 134 and a steering system (not depicted) connected to the wheels 136. The baggage vehicle 101 may include location tracking sensors (e.g., a global positioning system circuitry) and one or more vehicle sensors. The one or more vehicle sensors may include any suitable vehicle sensors, such as, but not limited to, an automatic parking sensor, a backup collision sensor, an intelligent parking assist sensor, a radar sensor, a lidar sensor, a camera, a computer vision system, or a laser system (e.g., a distance sensors, a photoelectric sensor, etc.). The baggage vehicle 101 may also communicate with one or more other airplanes or an air traffic control (e.g., by a wireless network in RF frequency). The baggage vehicle 101 may be configured to traverse the airport by a preset map of the airport with one or more drive paths. Based on location data from the location tracking and the one or more vehicle vision sensors, the propulsion unit 134 may be autonomously controlled with a level of autonomous driving, such as, but not limited to a Society of Automotive Engineers (SAE) level 0 to 5 system. For example, the baggage vehicle 101 may provide a warning and intervention control (e.g., autonomous braking), in accordance with a level 0 system. By way of another example, the baggage vehicle 101 may provide a driver assist (e.g., parking assist), in accordance with a level 1 system. By way of another example, the baggage vehicle 101 may provide lane centering and adaptive cruise control, in accordance with a level 2 system. By way of another example, the baggage vehicle 101 may include autonomous driving with a user driver assist, in accordance with a level 3 system. By way of another example, the baggage vehicle 101 may include a pedal and/or steering wheel optional system, in accordance with a level 4 system. By way of another example, the baggage vehicle 101 may include fully autonomous driving with no steering wheel required to operate the device, in accordance with a level 5 system.

FIG. 2 depicts the baggage vehicle 101, in accordance with one or more embodiments of the present disclosure.

In embodiments, the baggage vehicle 101 includes the storage area 108 with the storage area conveyor 112. As depicted in FIG. 2, the storage area 108 and the storage area conveyor 112 may span a width of the baggage vehicle 101. In this regard, the storage area 108 may be configured to receive various large cargo, such as, but not limited to, airplane parts, caskets, or tires. The device may also include the pivotable connection 110 and the exterior conveyor 102, in accordance with one or more embodiments of the present disclosure.

In embodiments, the baggage vehicle 101 includes the lateral sorter 140. The lateral sorter 140 may include the plurality of directional conveyors 202. The plurality of directional conveyors 202 may include one or more left-hand directional conveyors 202*a* and one or more right-hand directional conveyor 202*b*. The plurality of directional conveyors 202 may be disposed at one or more angles on the baggage vehicle 101 (e.g., between ±30 to 60 degrees from a side of the storage portion 204). The plurality of directional conveyors 202 may be selectively actuated to convey the baggage to the storage area 108. Furthermore, the plurality of directional conveyors 202 may be actuated in a reverse direction to convey the baggage from the storage area 108 to the exterior conveyor 102 (e.g., a two-way conveyor), thereby unloading the storage area 108.

The plurality of directional conveyors 202 may also be configured to manipulate the orientation of the baggage by varying speeds of various conveyors of the plurality of directional conveyors 202. In this regard, the baggage may be rotated by selectively engaging the left-hand conveyor(s) 202*a* in a direction and the right-hand conveyor(s) 202*b* in a direction. By manipulating the baggage's orientation, the baggage may be oriented to most effectively fill the storage area (e.g., with a longest allowable dimension widthwise). Such manipulation may be determined based on one or more sensor data received by the controller (e.g., a baggage vision sensor to approximate the baggage width and length).

The number and configuration of directional conveyors 202 depicted is not intended to be limiting. In this regard, any number and configuration of directional conveyors 202 may be used to sort the baggage into the storage areas 108.

FIG. 3A-3B depicts the baggage vehicle 101, in accordance with one or more embodiments of the present disclosure.

In embodiments, the storage portion 204 may include storage areas 108 which are laterally adjacent. The left-hand directional conveyors 202*a* may be directed toward a first column of the storage areas (depicted in FIG. 3A-3B as 108*a*, 108*c*, and 108*e*) and the right-hand directional conveyors 202*b* may be directed toward a second column of the storage areas (depicted in FIG. 3A-3B as 102*b*, 102*d*, 108*f*). In this regard, the left-hand directional conveyors 202*a* may be selectively actuated to convey the baggage to the storage areas 108*a*, 108*c*, and 108*e*, while the right-hand directional conveyors 202*b* may be selectively actuated to convey the baggage to the storage areas 108*b*, 108*d*, and 108*f*. In this regard, the baggage may be loaded and unloaded from the laterally adjacent storage areas 108.

In embodiments, the baggage vehicle 101 includes a vertical sorter 114. The vertical sorter 114 may vertically sort the baggage between vertically adjacent storages 108*a*, 108*c*, and 108*e*; and/or vertically adjacent storage areas 108*b*, 108*d*, and 108*f*. The vertical sorter 114 may be configured to sort the baggage by raising and lowering the baggage. The vertical sorter 114 may be configured to raise and lower the baggage by any suitable mechanism, such as, but not limited to, a scissor mechanism, a rack and pinion, a lead screw, a ball screw, forklift mast, a hoist, a hydraulic actuator, or a winch and cable.

The lateral sorter 140 may also be combined with the vertical sorter 114 to store baggage in a plurality of storage areas which may be laterally and/or vertically disposed (e.g., storage areas 108*a*, 108*b*, 108*c*, 108*d*, etc.). The lateral sorter 140 may be configured to sort the baggage laterally in any suitable fashion, such as the plurality of directional conveyors 202, the horizontal stage 504 (as depicted in FIG. 5A-5C), a diverter (not depicted), or a pusher (not depicted). In this regard, the lateral sorter 140 may be connected to the vertical sorter 114.

In embodiments, the exterior conveyor 102 may also be connected to the vertical sorter 114. In this regard, the height of the exterior conveyor 102 may be selectively adjusted by the vertical sorter 114. For example, the second end 106 of the exterior conveyor 102 may be selectively adjusted by the vertical sorter 114 to storage areas of different heights. By way of another example, the first end 104 of the exterior conveyor 102 may also be selectively adjusted by the vertical sorter 114 to the airplane cargo bay or ground level. The first end 104 may also be pivoted about the pivotable connection 110, in accordance with one or more embodiments of the present disclosure.

For example, the baggage is to be stored in the upper left storage area 108a. The exterior conveyor 102 and the lateral sorter 140 may be at a home position on the bottom storage area (as depicted in FIG. 3A). The controller may engage the vertical sorter 114 to raise the plurality of directional conveyors 202 and the second end 106 of the exterior conveyor 102 to the height of the upper left storage area 108a (as depicted in FIG. 3B). As the second end 106 of the exterior conveyor is raised, the first end 104 may be raised a similar amount. To compensate for this amount, the exterior conveyor 102 may be rotated to pivot the first end 104 downwards about the pivotable connection 110 by the controller 120. The baggage may then be loaded onto the first end 104 and conveyed to the plurality of directional conveyors 202. The left-hand directional conveyors 202a may then be engaged to sort the baggage into the upper left storage area 108a.

Figure 3C:
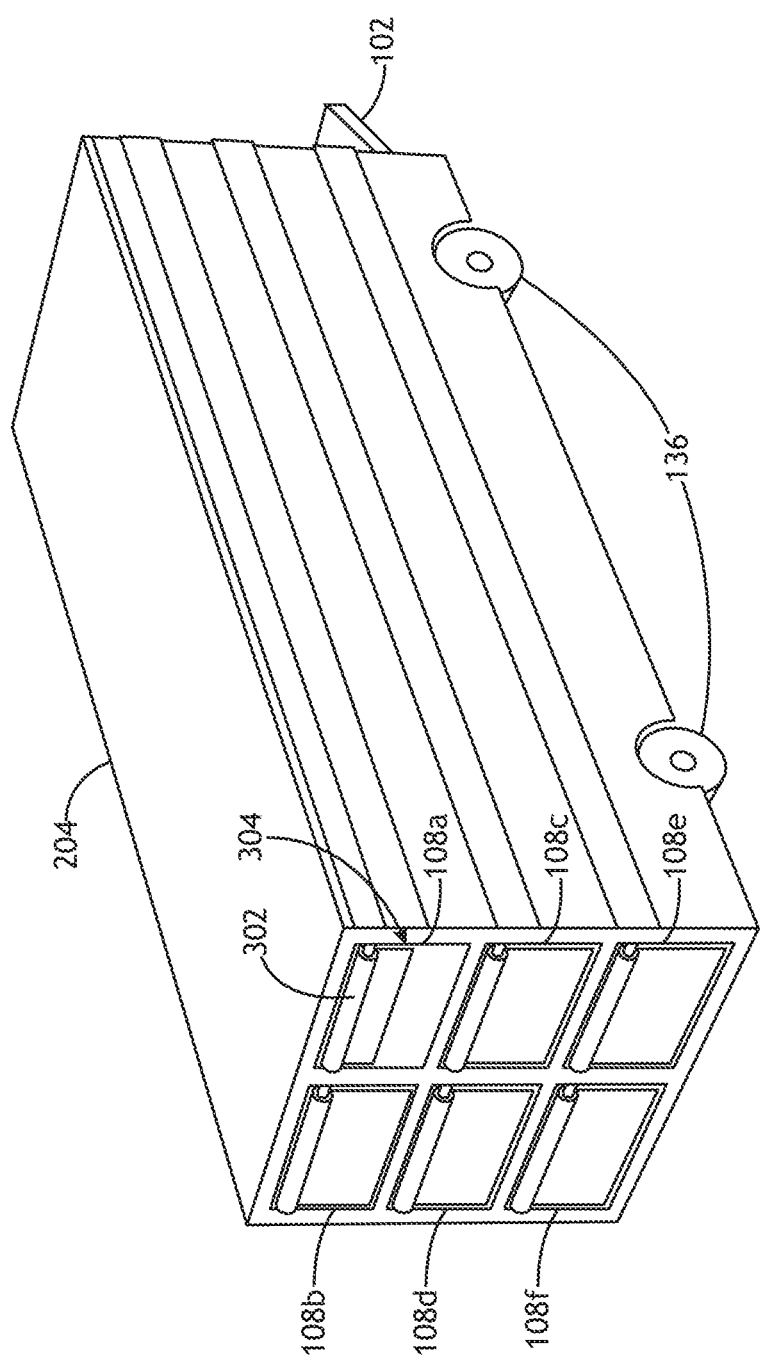
FIG. 3C illustrates a rear view of the baggage storage device, in accordance with one or more embodiments of the present disclosure.

FIG. 3C illustrates a rear view of the baggage vehicle 101. The baggage vehicle 101 may have one or more rear openings 304. The rear openings 304 may be associated with the storage areas 108 of the device. For example, each rear opening 108 may have an associated rear opening 304. The baggage vehicle 101 may be configured to unload baggage from the storage area 108 by the rear opening (e.g., by the storage area conveyor 112 or the plurality of rollers). The baggage vehicle 101 may also include one or more rear opening covers 302. For example, FIG. 3C depicts the rear opening cover 302 which includes a rear opening cover 302. The rear opening cover 302 may cover the rear opening 304, thereby preventing baggage from being conveyed from the storage area 108. The rear opening cover 302 may be selectively raised, such that baggage may then be conveyed through the rear opening 304 (e.g., by the controller 120). The rear opening cover 302 is depicted as a roll up rear opening cover, such as, but not limited to, a roller door (e.g., a vinyl overhead door). This is not intended to be limiting. In this regard, the rear opening cover 302 may include any suitable mechanism configured to selectively cover the rear opening 304, such as, but not limited to, a roller door mechanism, one or more sectional panels, a one piece track door, a monolithic door, or a hinged door.

Figure 4B:
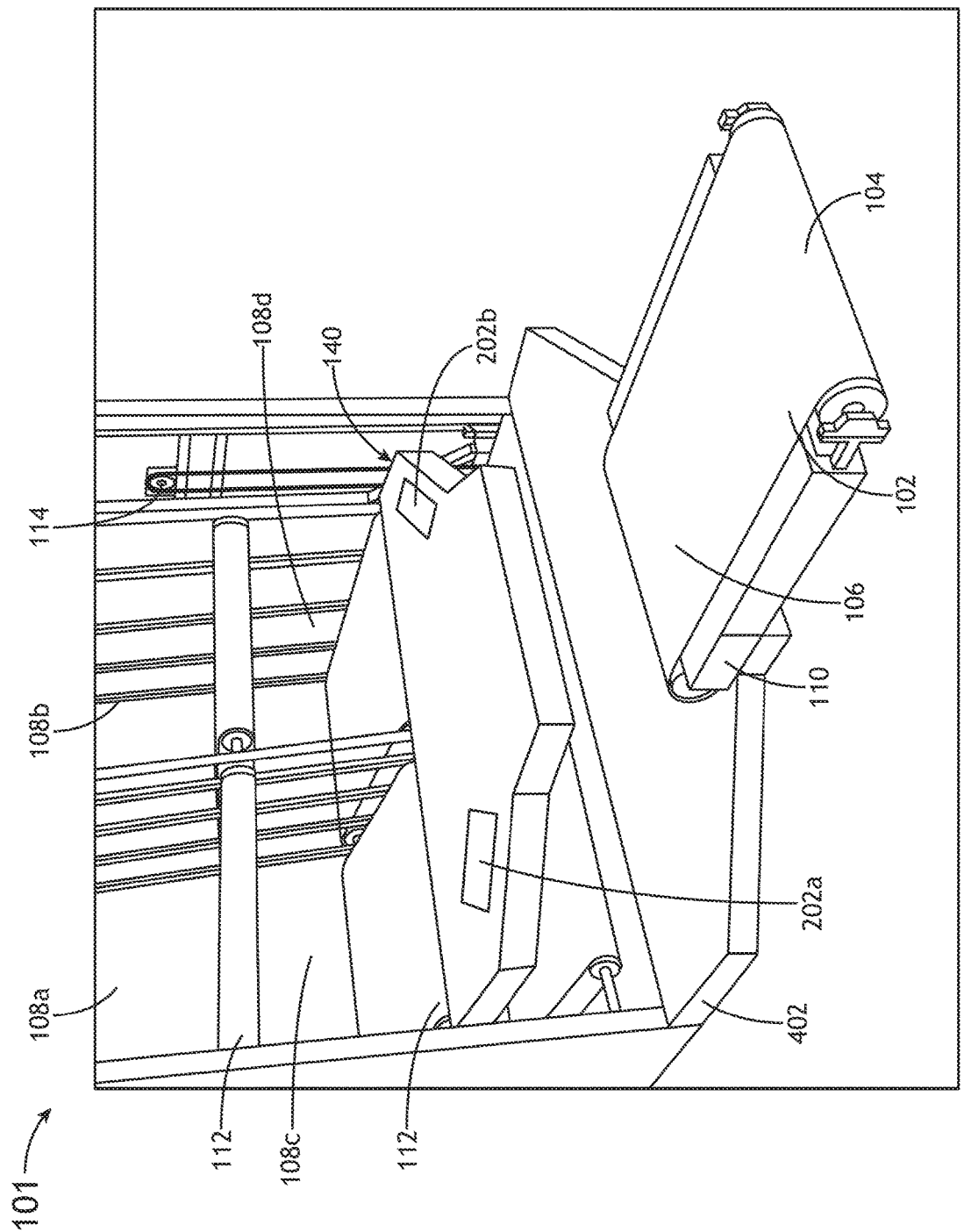
FIG. 4B illustrates a perspective view of the baggage storage device, in accordance with one or more embodiments of the present disclosure.
Figure 5A:
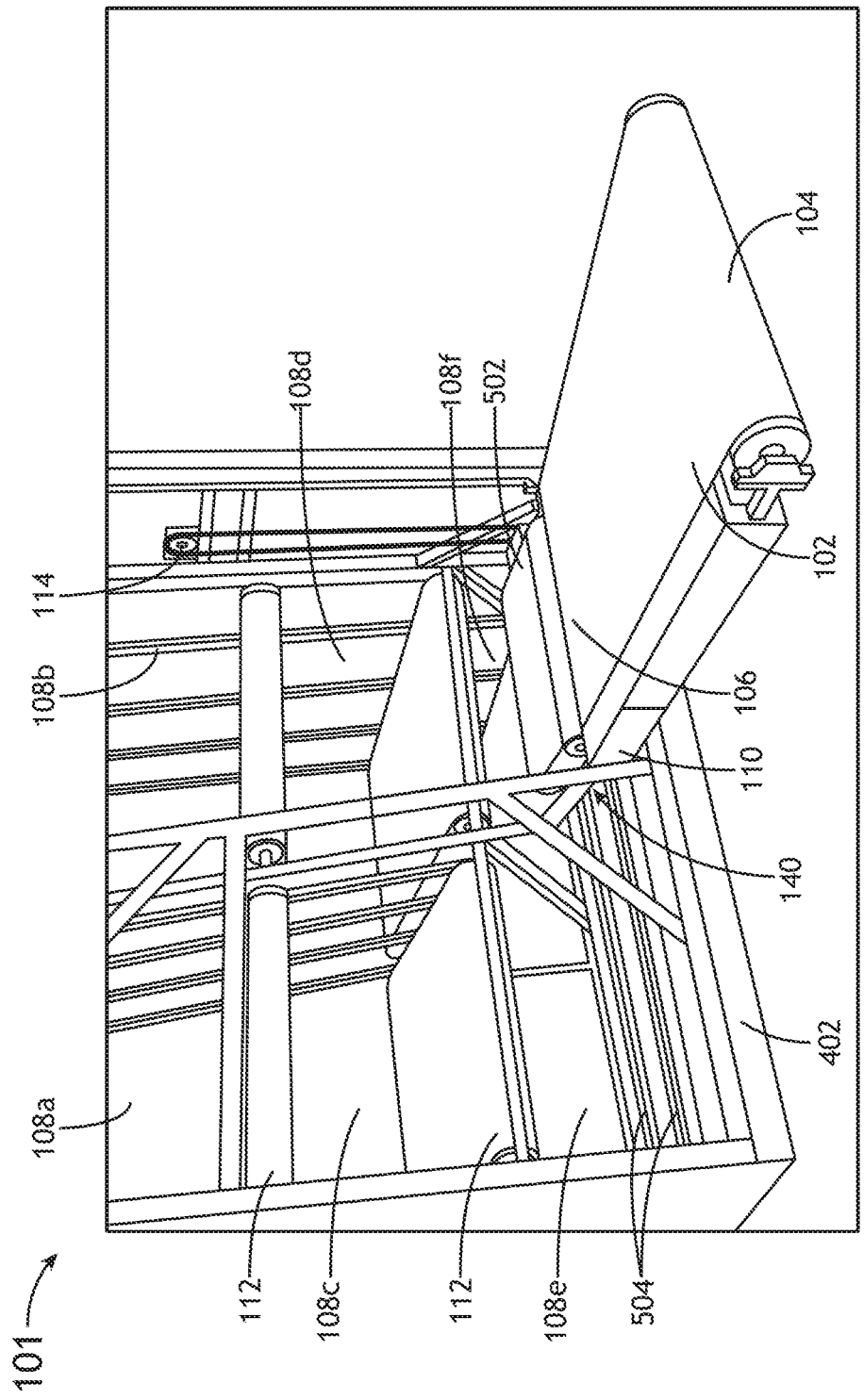
FIG. 5A illustrates a perspective view of the baggage storage device, in accordance with one or more embodiments of the present disclosure.
Figure 5B:
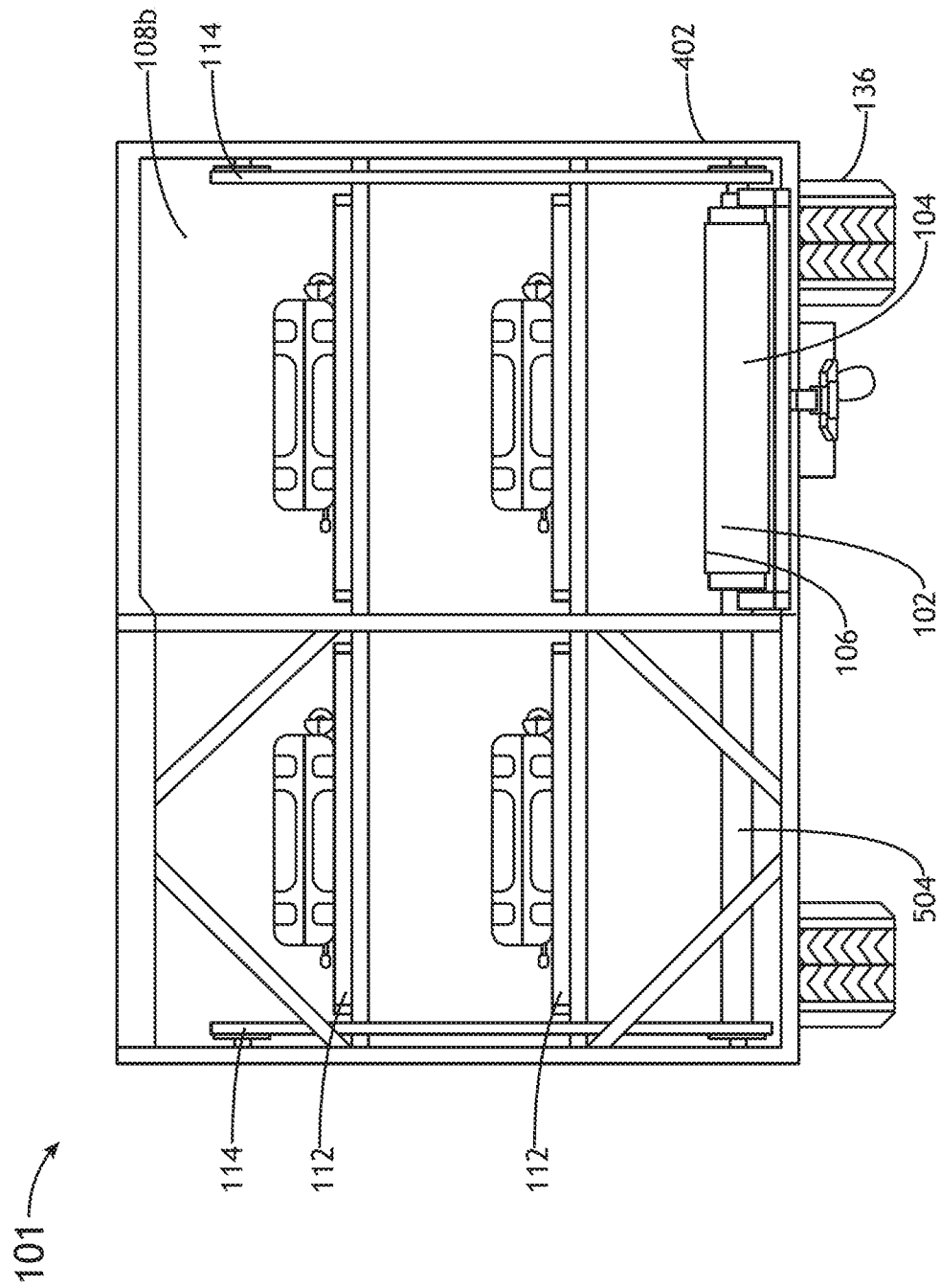
FIG. 5B illustrates a front view of the baggage storage device, in accordance with one or more embodiments of the present disclosure.
Figure 5C:
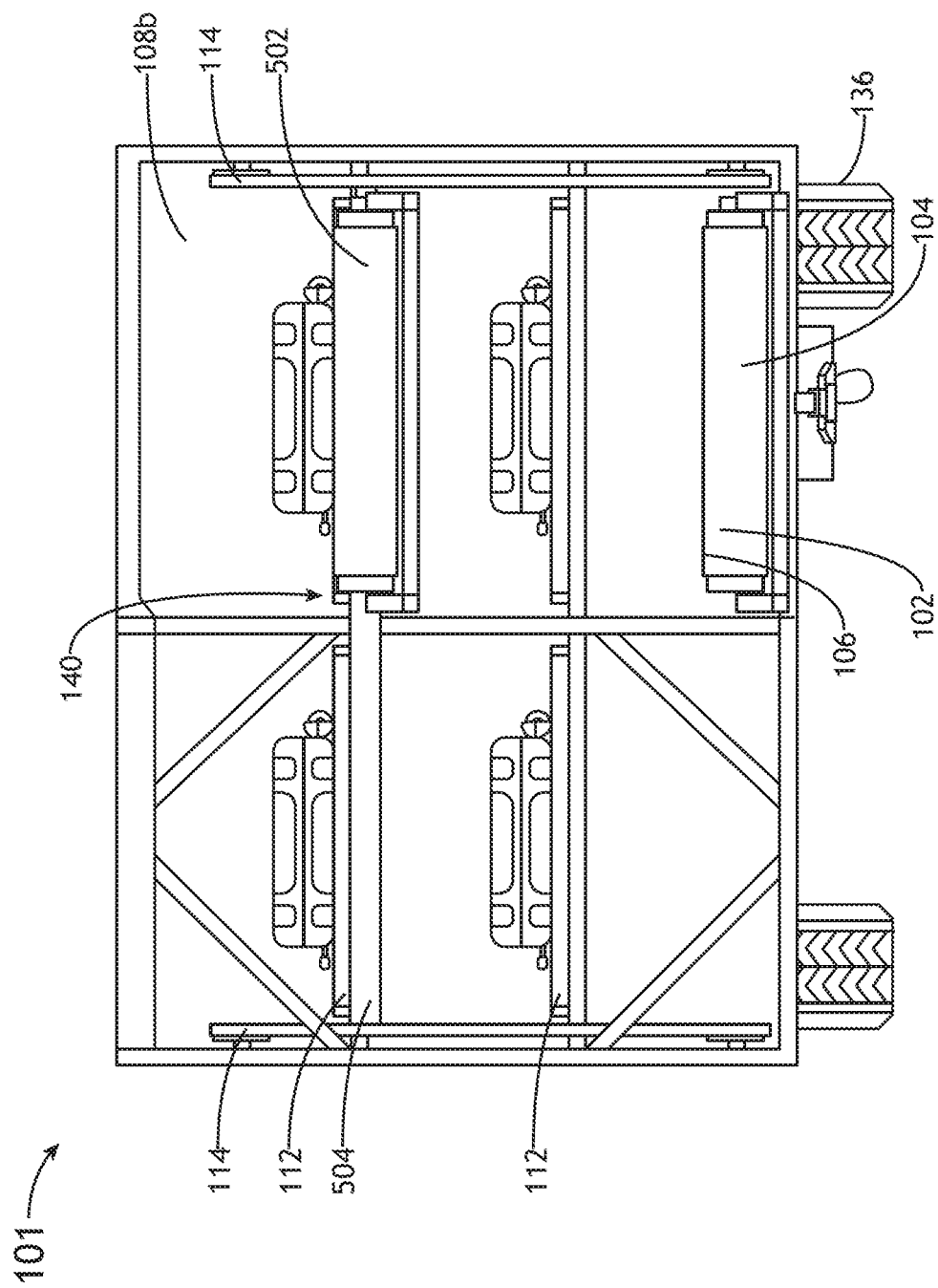
FIG. 5C illustrates a front view of the baggage storage device, in accordance with one or more embodiments of the present disclosure.

FIGS. 4A-4B depicts the baggage vehicle 101, in accordance with one or more embodiments of the present disclosure.

Although the vertical sorter 114 has been described as being configured to raise and lower the exterior conveyor 102, this is not intended as a limitation on the present disclosure. For example, the exterior conveyor 102 may be connected to a frame 402. The frame 402 may connect to the storage portion 204. In this regard, the second end 106 of the exterior conveyor 102 may remain at a fixed height, while the first end 106 may be configured to raise and lower by pivoting about the pivotable connection 110 (e.g., to raise and lower to a ground height or to an aircraft height). The lateral sorter 140 may be connected to the vertical sorter 114 for raising and lowering the height of the lateral sorter 140.

For example, the baggage is to be stored in an upper left storage area of the baggage vehicle 101 (e.g., 108a). The plurality of directional conveyors 202 may be in a home position at a height of the lowest storage areas (102e and 102f as depicted in FIG. 3A). Baggage may be conveyed to the plurality of directional conveyors 202 by the exterior conveyor 102. The vertical sorter 114 may then be engaged to raise the plurality of directional conveyors 202 and the baggage to a height of the upper storage areas 102a and 102b (as depicted in FIG. 4B). The left-hand directional conveyor(s) 202a may then be engaged to convey the baggage into the front of the upper left storage compartment 108a. The baggage may then be conveyed from the front of the upper left storage compartment 108a to the rear by the storage area conveyor 112. The plurality of directional conveyors 202 may then return to the home position by the vertical sorter 114.

FIGS. 5A-5C illustrates the baggage vehicle 101, in accordance with one or more embodiments of the present disclosure.

In embodiments, the lateral sorter 140 includes a secondary conveyor 502 and the horizontal stage 504. The secondary conveyor 502 may be configured to load and unload (e.g., a two-way conveyor) the storage areas 108 by any suitable mechanism, such as, but not limited to, a conveyor belt, a power roller conveyor, an omni-directional conveyor, or a chain conveyor. The horizontal stage 504 may be configured to translate the secondary conveyor 502 in a lateral direction by a connection to the secondary conveyor 502. In this regard, the secondary conveyor 502 may be translated between the laterally adjacent storage areas (e.g., 108a, 108b). The horizontal stage 504 may include any suitable linear stage, including, but not limited to, a rack and pinion, a lead screw, a ball screw, a forklift mast, a hoist, or a hydraulic actuator. The horizontal stage 504 may also be connected to the vertical sorter 114. In this regard the secondary conveyor 502 may be positioned to various vertically or laterally disposed storage areas (e.g., 108a-108d). The secondary conveyor 502 and the horizontal stage may also be controlled by the controller 120.

For example, the baggage is to be stowed in an upper left storage area (e.g., 108a) of the baggage vehicle 101. The secondary conveyor 502 may be in a home position (e.g., a starting position; zero return position) located at a bottom right storage area, as depicted in FIG. 5A-B. The baggage may be conveyed to the secondary conveyor 502 by the exterior conveyor 102. The vertical sorter 114 may then be engaged to raise the horizontal stage 504, the secondary conveyor 502, and the baggage to a height of the upper left storage area (as depicted in FIG. 5C). The horizontal stage 504 may then be engaged to shift the secondary conveyor 502 and the baggage to the front opening of the upper left storage area. The secondary conveyor 502 may then be engaged to convey the baggage into the front of the upper left storage compartment. The baggage may then be conveyed from the front of the upper left storage compartment to the rear by the storage area conveyor 112. The secondary conveyor 502 may then return to the home position by the vertical sorter 114 and the horizontal stage 504.

Figure 6:
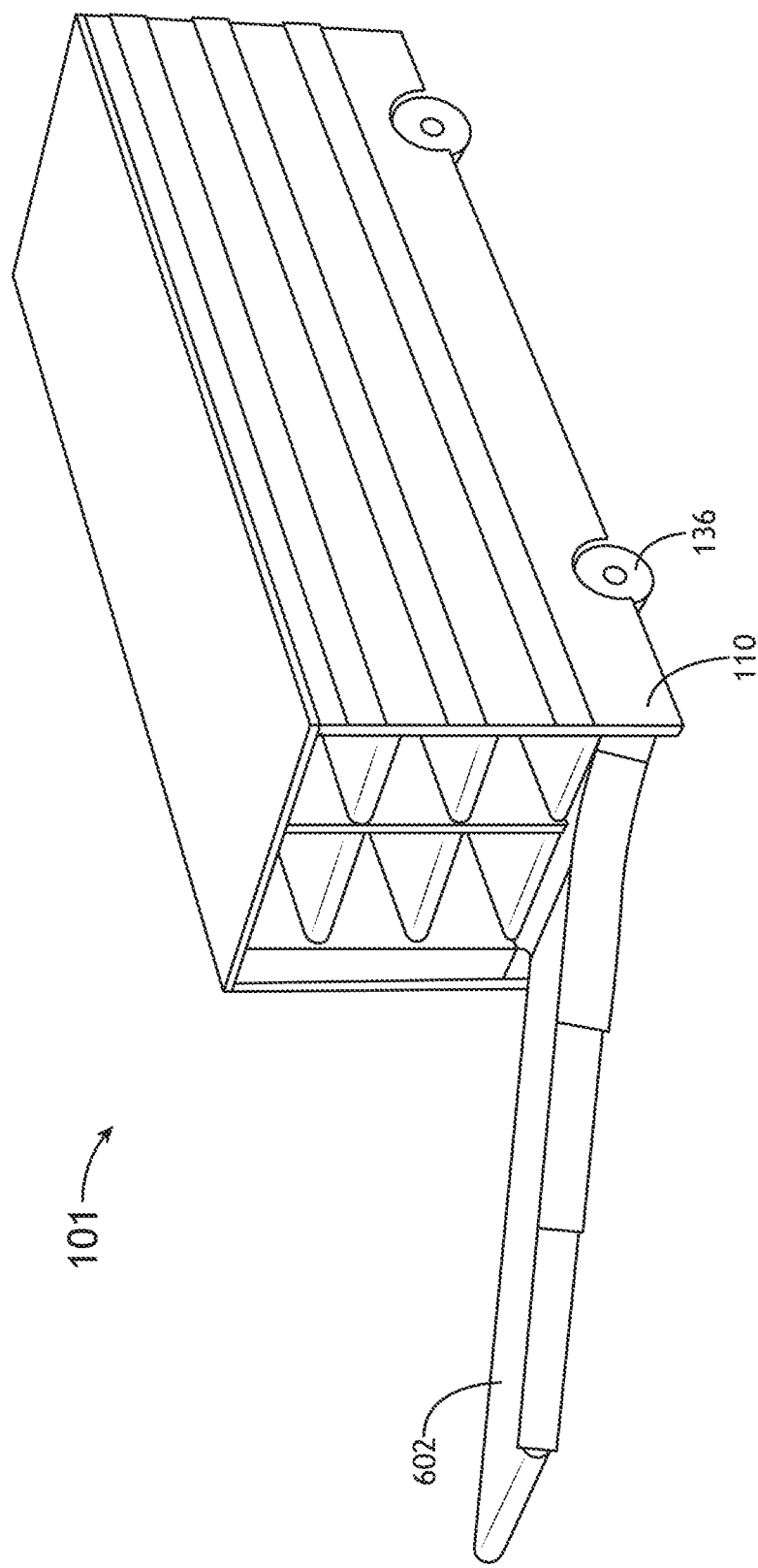
FIG. 6 illustrates a perspective view of the baggage storage device, in accordance with one or more embodiments of the present disclosure.

FIG. 6 depicts a telescoping exterior conveyor 602, in accordance with one or more embodiments of the present disclosure.

In embodiments, the exterior conveyor 102 is configured to telescope 602. The telescoping exterior conveyor 602 may be configured to load and unload baggage across a wide range of airplane heights. For example, a distance between a ground level to an aircraft cargo bin door may be 148 inches. The telescoping exterior conveyor 602 may be telescoped to a maximum length and pivoted to an angle which is 30 degrees relative to the ground to reach such height. By way of another example, the telescoping exterior conveyor 602 may be used to load and unload the baggage from the ground. The telescoping exterior conveyor 602 may be telescoped to its shortest length and pivoted to an angle which is −15 degrees relative to the ground. The telescoping exterior conveyor 602 may be configured to extend and retract by the controller 120, in accordance with one or more embodiments of the present disclosure. A telescoping conveyor is disclosed in U.S. Pat. No. 6,431,346, filed on Apr. 5, 2000, which is incorporated herein by reference in its entirety.

In embodiments, the baggage vehicle 101 may use the telescoping exterior conveyor 602, the pivot connection 110, and the vertical sorter 114 to maintain the first end 104 of the exterior conveyor 102 at an airplane bay while raising the second end 106. The first end 104 may be maintained at the airplane bay by retracting the telescoping exterior conveyor 602, raising the exterior conveyor 602 by the vertical sorter 114, and rotating the first end 104 downwards about the pivot connection 110.

Although the exterior conveyor 102 has been described as telescoping 602, this is not intended as a limitation on the present disclosure. For example, the exterior conveyor 102 may be configured to fold (not depicted). By folding, the exterior conveyor 102 may be converted from a load and unload configuration to a transport configuration. The exterior conveyor may include a folding mechanism connecting a first and a second conveyor of the exterior conveyor. The folding mechanism may fold the first and the second conveyor together. A folding conveyor is disclosed in U.S. Pat. No. 6,708,814, filed on Sep. 30, 2002, which is incorporated by reference herein it its entirety.

Figure 7A:
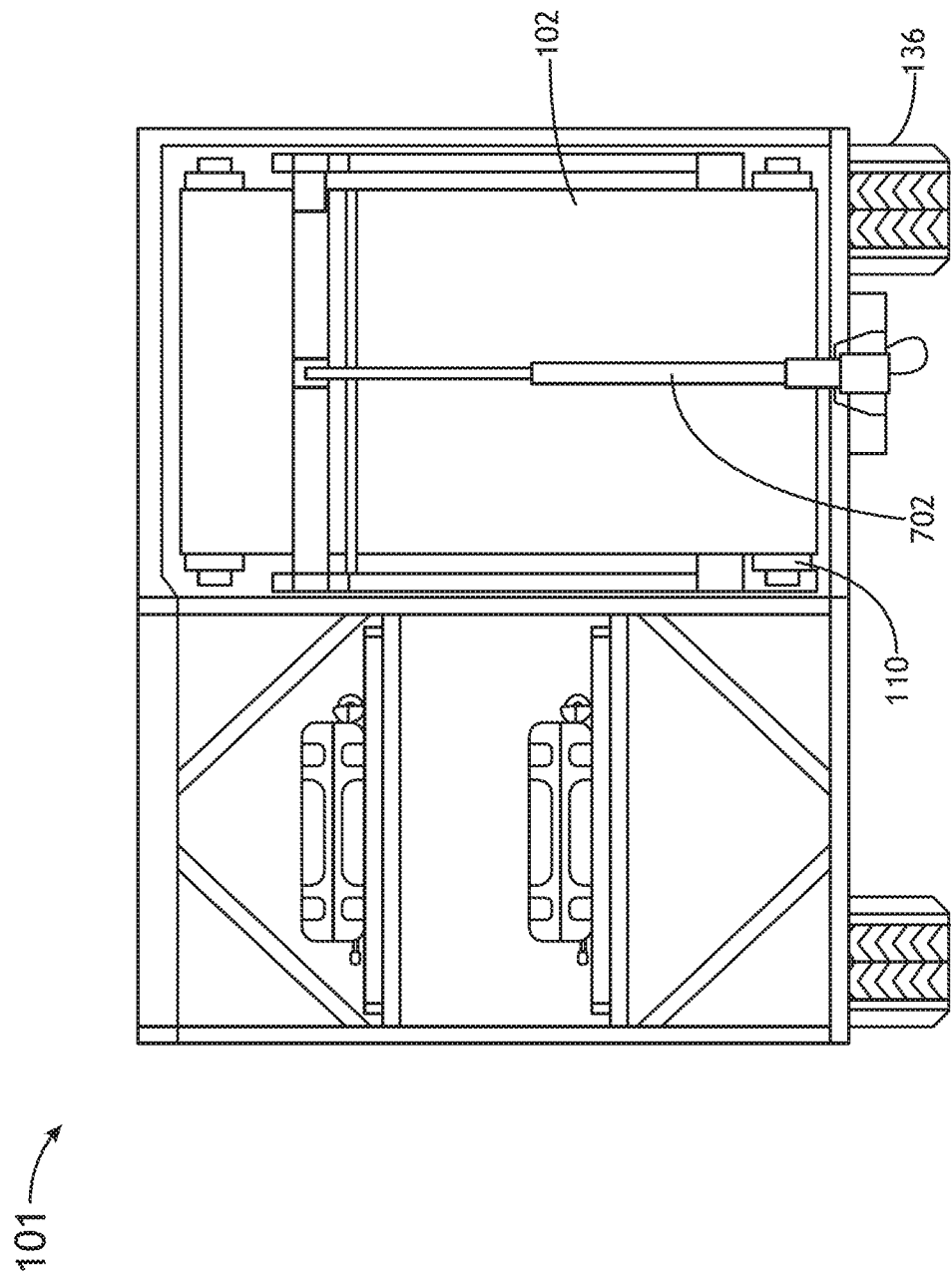
FIG. 7A illustrates a front view of the baggage storage device, in accordance with one or more embodiments of the present disclosure.
Figure 7B:
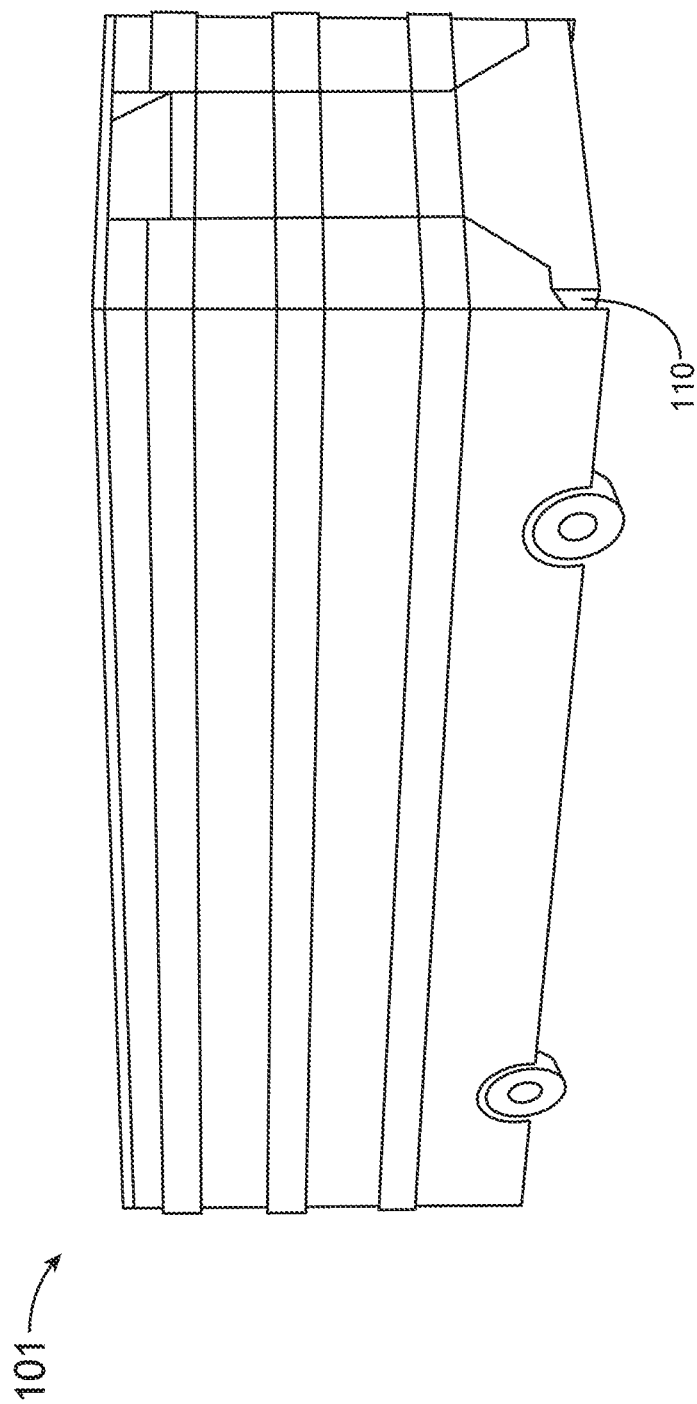
FIG. 7B illustrates a perspective view of the baggage storage device, in accordance with one or more embodiments of the present disclosure.

FIGS. 7A-7B depict a transport configuration of the baggage vehicle 101, in accordance with one or more embodiments of the present disclosure.

In embodiments, the baggage vehicle 101 may include a transport configuration. The baggage vehicle 101 may have a reduced transport size when in the transport configuration. The exterior conveyor 102 may be configured to pivot towards the storage area about the pivotable connection 110. As depicted in FIG. 7A, the baggage vehicle 101 may include an actuator 702. The actuator 702 may be configured to pivot the exterior conveyor 102 between one or more positions, such as, but not limited to, a vertically stowed position (e.g., at an angle of 90 degrees relative to the ground), as depicted in FIG. 7A. This stowed configuration may reduce a transport size of the baggage vehicle 101.

Although the baggage vehicle 101 has been described to include an actuator 702, this is not intended to be limiting. In this regard, the exterior conveyor 102 may be configured to pivot about the pivotable connection 110 in any suitable manner, such as, but not limited to, a rotary actuator, linear actuator, hydraulic lift, a pneumatic lift, or a cable winch. Furthermore, the lateral sorting device (e.g., the plurality of directional conveyors 202) may also be configured to pivot to the transport configuration, as depicted in FIG. 7B.

As discussed in one or more embodiments of the present disclosure, the exterior conveyor 102 may be configured to telescope or fold. The ability to telescope or fold the exterior conveyor 102 may provide for a reduced transport size of the device while also providing for an exterior conveyor 102 with a greater working length.

Figure 8:
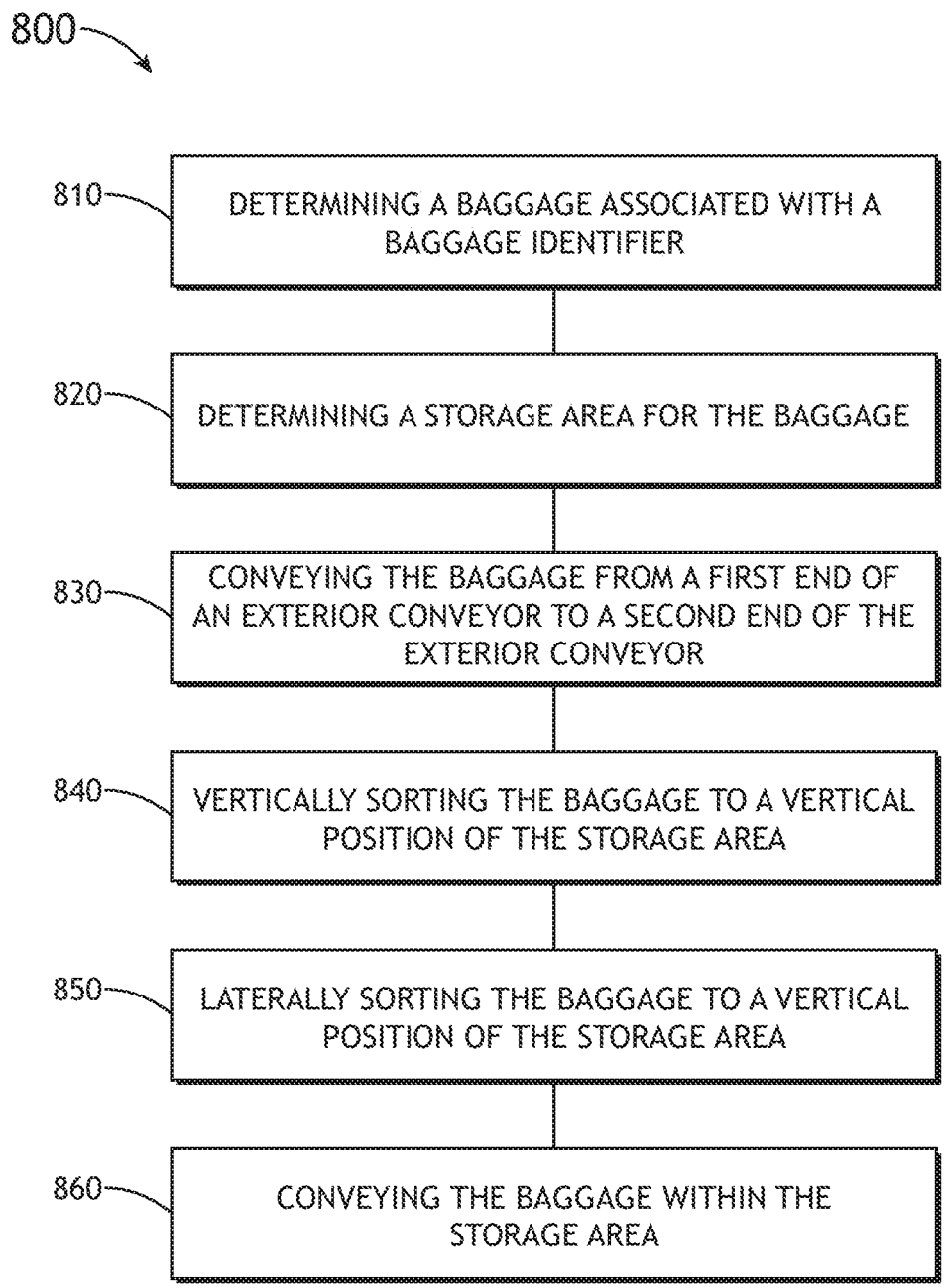
FIG. 8 illustrates a method of sorting baggage to a baggage storage area, in accordance with one or more embodiments of the present disclosure.

FIG. 8 depicts a method 800 of sorting baggage into a storage area, in accordance with one or more embodiments of the present disclosure.

As shown in FIG. 8, a method 800 includes determining a baggage associated with a baggage identifier in a step 810, determining a storage area for the baggage in a step 820, convey the baggage from a first end of the exterior conveyor to a second end of the exterior conveyor in a step 830, vertically sort the baggage to a vertical position of the storage area in a step 840, laterally sort the baggage to a lateral position of the storage area in a step 850, and convey the baggage within the storage area in a step 860.

The method 800 may include a step 810, to determine a baggage associated with a baggage identifier. The step 810 may further include receiving the baggage identifier by at least one of an RFID tag, a barcode, or a visual machine learning algorithm. The baggage identifier may be received from a component of a baggage vehicle (e.g., baggage vehicle 101) or by a component separate from the baggage vehicle, such as a handheld reader. In response to receiving the baggage identifier, the baggage identifier may be looked up in a database housed on a server (e.g., server 128) by the network connection.

The method 800 may include a step 820, to determine a storage area for the baggage. The determination of the storage area for the baggage in the step 820 may be based on at least one of a dimension, a weight, or a destination of the baggage. The determination of the storage area for the baggage in the step 820 may also be based on a determination that the storage area has room to receive the baggage. In this regard, the database may include a capacity of the storage area and a current amount of baggage filling the storage area. Subtracting the amount of baggage from the capacity may provide an amount of available space. If the dimensions of the baggage to be received is smaller than the available space, then the storage area may be determined to be able to receive the baggage.

The method 800 may include a step 830, to convey the baggage from a first end of an exterior conveyor to a second end of an exterior conveyor. The baggage may be received by the first end of the exterior conveyor from at least one of an aircraft, a ground, or a baggage handling area.

The method 800 may include a step 840, to vertically sort the baggage to a vertical position of the storage area. The baggage may be vertically sorted by any suitable mechanism, such as, but not limited to, a scissor mechanism, a rack and pinion, a lead screw, a ball screw, forklift mast, a hoist, a hydraulic actuator, or a winch and cable.

The method 800 may include a step 850, to laterally sort the baggage to a lateral position of the storage area by a horizontal sorter. The baggage may be vertically sorted by any suitable mechanism, such as, but not limited to, a horizontal stage connected to a secondary conveyor, a plurality of directional conveyors, a diverter, a pusher, or an omni-directional conveyor.

The method 800 may include a step 860, to convey the baggage within the storage area. The baggage may be conveyed within the storage area by a storage area conveyor.

Similarly, the method 800 may be performed in a reverse direction. In this regard, baggage stored in the storage area may be conveyed to the first end of the exterior conveyor.

Figure 9:
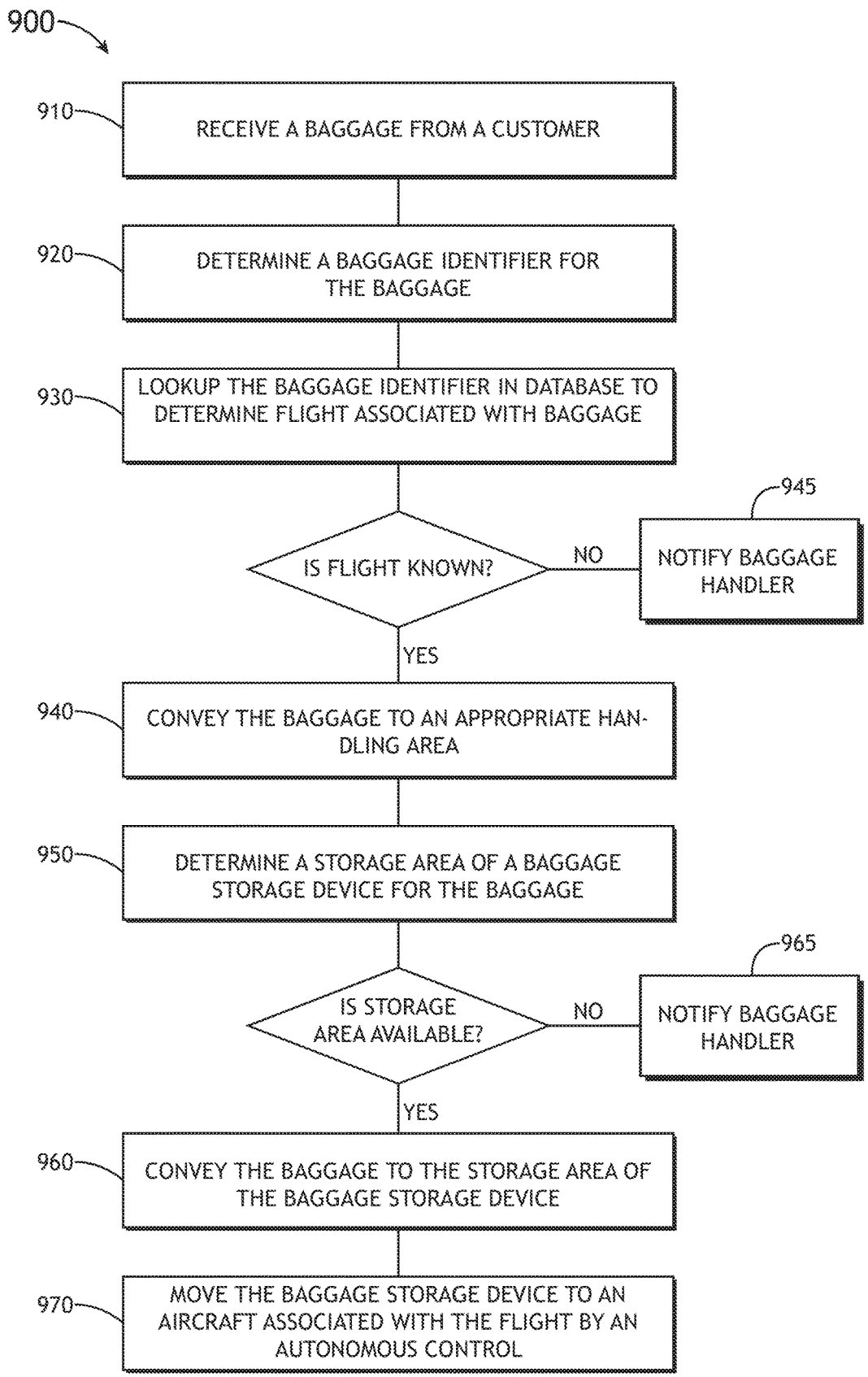
FIG. 9 illustrates a flow diagram, in accordance with one or more embodiments of the present disclosure.

FIG. 9 depicts a flow diagram 900, in accordance with one or more embodiments of the present disclosure.

In embodiments, the baggage handling system 100 is configured to execute the flow diagram 900.

The baggage handling system 100 may be configured to receive a baggage from a customer 910.

The baggage handling system 100 may determine a baggage identifier for the baggage 920. The baggage may have a baggage tag (e.g., an IATA code) readable by a bar code reader. The bar code may be scanned by the bar code reader and provided to the system. The system may then identify the baggage by comparing the scanned bar code with a database of known baggage bar codes.

The baggage handling system 100 may then lookup the baggage identifier in a database to determine a flight associated with the baggage 930.

If the baggage does not have a known flight, the baggage handling system 100 may notify a baggage handler 945.

If the baggage has a known flight, the baggage handling system 100 may convey the baggage to an appropriate handling area 940. The baggage may be conveyed by one or more conveyors (further depicted in FIG. 10). The appropriate handling area may be associated with the flight.

The baggage handling system 100 may then determine an appropriate storage area of a storage vehicle 950. The storage vehicle may include the baggage vehicle 101. The determining an appropriate storage area of the storage vehicle 950 may be based on a sorting scheme. The sorting scheme may include one or more factors which are evaluated when determining the appropriate storage area 950. The sorting scheme may include a factor of the storage area has an open spot for the baggage (e.g., the storage area is not full of other baggage). The sorting scheme may include a factor of at least one of a dimension, weight, or destination of the baggage. The sorting scheme may include a factor of a passenger status of a passenger associated with the baggage (e.g., a first-class customer may receive preferential storage treatment). The sorting scheme may include a factor of a type of the baggage (e.g., breakable baggage may get preferential storage treatment; US mail may be conveyed to a US mail storage area, etc.). The sorting scheme include a factor of a flight delay time of a flight associated with the baggage. The sorting scheme may further be evaluated by a process improvement algorithm (not depicted). The process improvement algorithm may be configured to estimate an optimal storage area of a plurality of storage vehicle based on the baggage flight data and a current baggage status of the plurality of storage vehicle. In this regard, the baggage may be sorted to a storage area to reduce a time until the baggage reaches the airplane and/or the terminal.

If the baggage handling system 100 determines there is no available storage area, the system 100 may provide a notification to a baggage handler 965.

If the baggage handling system 100 determines a storage area is available, the baggage may be conveyed to the storage area 960. The baggage may be conveyed to the storage area, in accordance with one or more embodiments of the present disclosure. For example, the storage vehicle may include one or more of an exterior conveyor, a lateral sorter, a vertical sorter, and a storage area conveyor.

The baggage handling system 100 may then move the storage vehicle to an aircraft associated with the flight by an autonomous control 970. The autonomous control 970 may be performed by one or more propulsion units on the storage vehicle. The autonomous control 970 may be a level of autonomous driving, such as, but not limited to an SAE level 0 to 5 system. For example, the autonomous control 970 may provide a warning and intervention control (e.g., autonomous braking), in accordance with a level 0 system. By way of another example, the autonomous control 970 may provide a driver assist (e.g., parking assist), in accordance with a level 1 system. By way of another example, the autonomous control 970 may include fully autonomous driving with no steering wheel required to operate the device, in accordance with a level 5 system. Any of the various SAE levels of autonomous control described can be performed by the controller 120. The autonomous control 970 may be based on data from various sensors, such as, but not limited to, location tracking sensors (e.g., a global positioning circuitry) or one or more vehicle sensors (e.g., an automatic parking sensor, a backup collision sensor, an intelligent parking assist sensor, etc.). The autonomous control 970 may be facilitated by a communication with one or more airplanes (e.g., by a wireless network in RF frequency). The autonomous control 970 may be based on a preset map of the airport with one or more drive paths.

Figure 10:
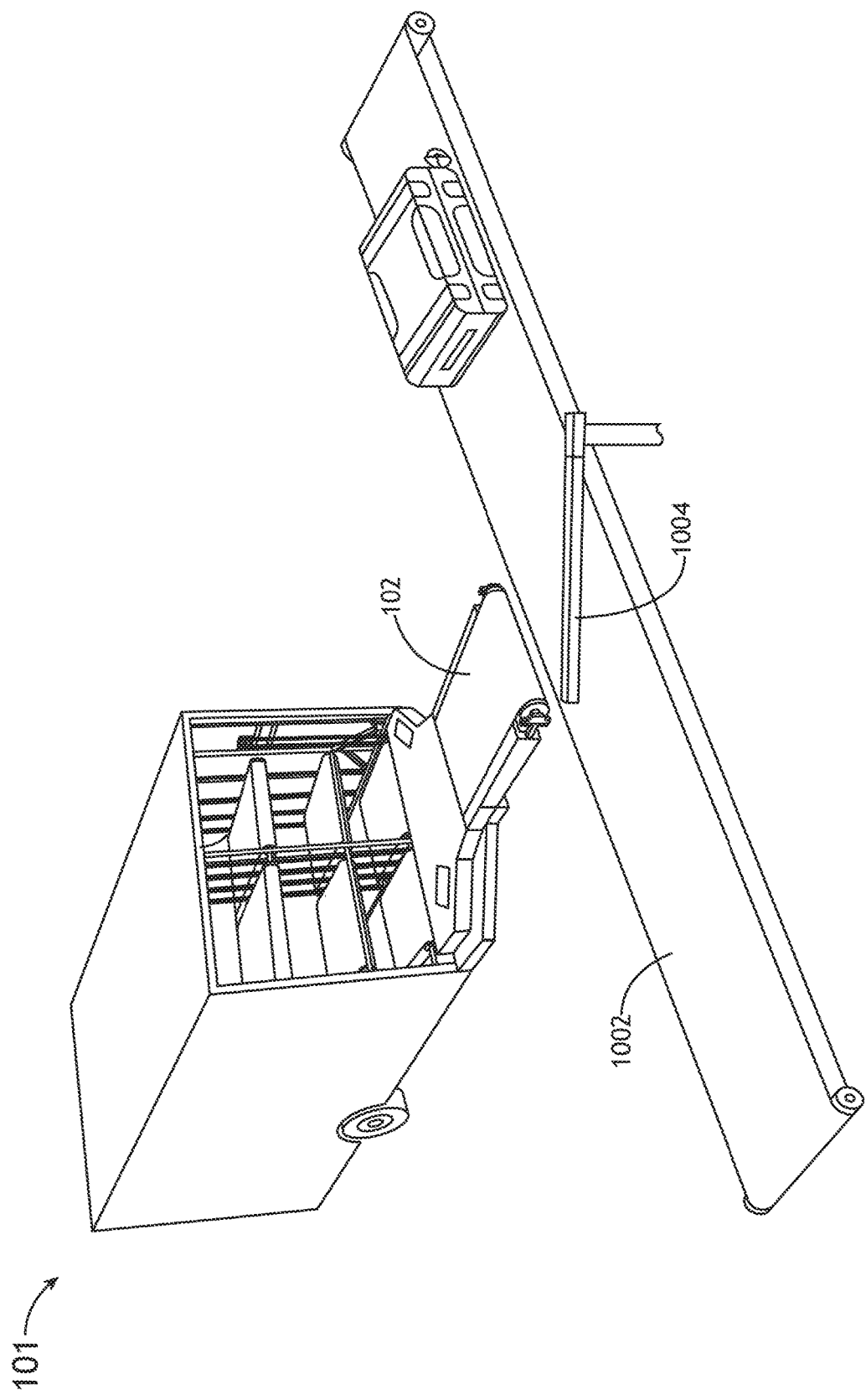
FIG. 10 illustrates the baggage storage device receiving a baggage, in accordance with one or more embodiments of the present disclosure.

FIG. 10 depicts the baggage vehicle 101 receiving a baggage 1006 from a conveyor 1002, in accordance with one or more embodiments of the present disclosure.

In embodiments, the baggage vehicle 101 is configured to receive baggage from the conveyor 1002. The conveyor 1002 depicted is merely illustrative. The conveyor 1002 may be a component of an aircraft baggage handling system (e.g., system 100 depicted by flow diagram 900). The system 100 may selectively convey the baggage 1006 to the conveyor 1002, according to any method known in the art. The baggage may then be conveyed by the conveyor 1002 to the baggage vehicle 101. FIG. 10 depicts a diverter 1004 as diverting the baggage to the baggage vehicle 101, but this is not intended to be limiting. The baggage vehicle 101 may receive the baggage from the conveyor 1002 by a first end 106 of the exterior conveyor 102. The baggage vehicle 101 may then sort the baggage to a selected storage area 108, in accordance with one or more embodiments of the present disclosure.

Figure 11:
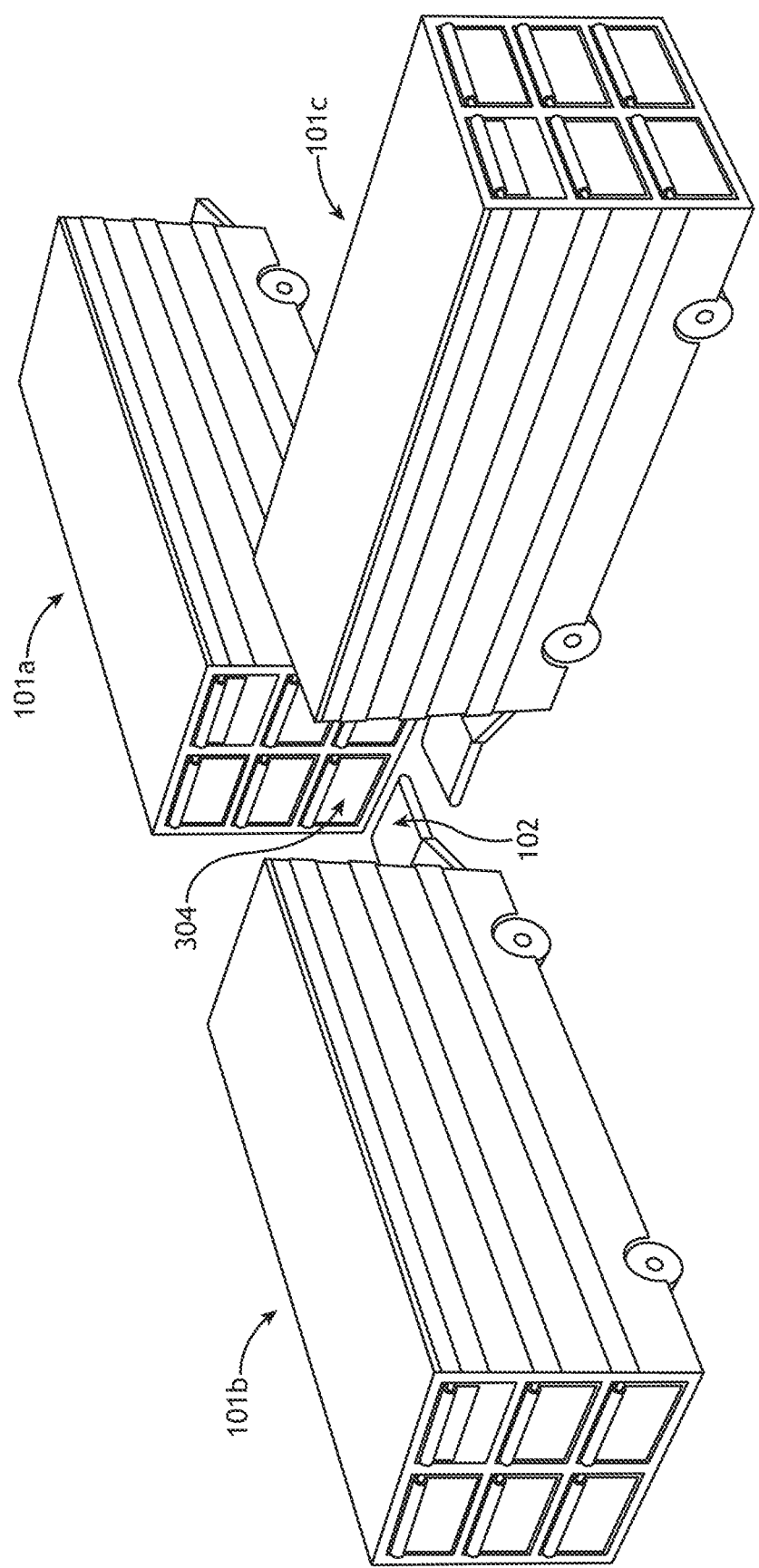
FIG. 11 illustrates a plurality of the baggage storage devices, in accordance with one or more embodiments of the present disclosure.

FIG. 11 depicts a first baggage vehicle 101a unloading baggage to a second baggage vehicle 101b and a third baggage vehicle 101c, in accordance with one or more embodiments of the present disclosure.

In embodiments, the baggage vehicle 101a may include a baggage (e.g., baggage 1006) in a storage area 108 of the baggage vehicle 101a. The baggage vehicle 101a may unload the baggage by engaging the storage area conveyor 112 and conveying the baggage through the rear opening 304 (further depicted in FIG. 3C). If the device includes the rear opening cover 302, the rear opening cover 302 must be raised before the baggage may be conveyed through the rear opening 304. The second baggage vehicle 101b may be moved to the rear opening 304. Similarly, the third baggage vehicle 101c may be moved to another rear opening 304. In this regard, the first baggage vehicle 101a may be considered a sorting device and the second and third baggage vehicle 101b, 101c may be considered a receiving device. The description of sorting and receiving devices is not intended to be limiting. For example, any of the baggage vehicle 101a, 101b, or 101c may be configured to sort baggage from a rear opening and receive baggage by an exterior conveyor 102. Furthermore, as depicted in FIG. 11, the second and/or third baggage vehicles 101b, 101c, may be positioned in various configurations at the rear of the first baggage vehicle 101a, such as, but not limited to, parallel to the first baggage vehicle 101a or perpendicular to the first baggage vehicle 101a.

The first, second, and third baggage vehicles 101a-101c may also be controlled by the baggage system 100 (e.g., by a controller of the system 100). In this regard, the system 100 may determine that a baggage held by the first baggage vehicle 101a should be on a certain flight. The second baggage vehicle 101b may be associated with this flight. The system 100 may sort the baggage from the first baggage vehicle 101a to the second baggage vehicle 101b by engaging the storage area conveyor 112 of the first baggage vehicle 101a. Then the baggage may be sorted to a storage area 108 on the second device associated with the baggage destination.

Although the baggage vehicle 101a is described as unloading the baggage by the rear opening 304, this is not intended as a limitation on the present disclosure. As discussed in one or more embodiments of the present disclosure, the secondary conveyor 112 and the exterior conveyor 102 may be a two-way conveyor. In this regard, the baggage vehicle 101a may unload the baggage from the storage area 108 by engaging the storage area conveyor 112 and the exterior conveyor 102 in a reverse direction.

Figure 12:
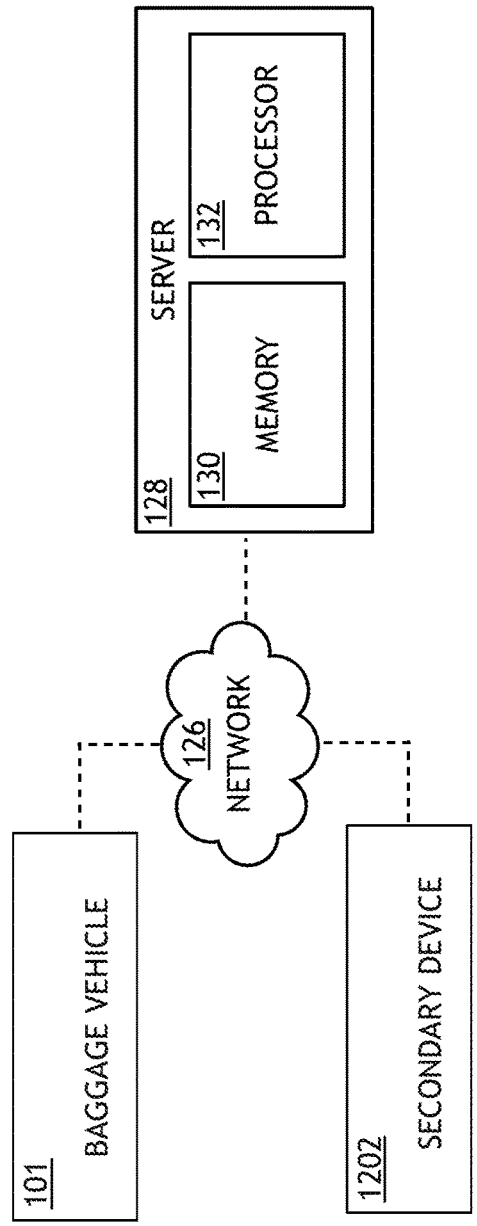
FIG. 12 illustrates a block diagram of the baggage storage system, in accordance with one or more embodiments of the present disclosure.

FIG. 12 depicts the system 100, in accordance with one or more embodiments of the present disclosure.

As discussed, the system 100 may include the baggage vehicle 101 which is connected to the server 128 by the network 126. The system 100 may further include one or more secondary devices 1202. The secondary device 1202 may be connected to the server 128 by the network 126.

The secondary device 1202 may include the conveyor 1002 or the diverter 1004. In this regard, conveyor 1002 and the diverter 1004 may communicate with the server 128 regarding the baggage being conveyed by the conveyor 1002 and diverted by the diverter 1004. The server 128 may then communicate this information to the baggage vehicle 101 by way of the network 126.

The secondary device 1202 may also include the second baggage vehicle 101b and the third baggage vehicle 101c. In this regard, the system 100 may perform various loading and unloading operations depicted in FIG. 11. Each of the baggage vehicles 101a-101c may be configured to communicate by way of the network 126. In this regard, the system 100 may include a plurality of baggage vehicles 101.

Referring generally to FIGS. 1A-12, the baggage handling system 100 is disclosed.

Although the lateral sorter 140 described in FIGS. 1A-2B is described as being either the secondary conveyor 502 connected to the horizontal stage 504 or the plurality of directional conveyors 202, this is not intended as a limitation on the present disclosure. For example, the lateral sorter 140 may include any suitable mechanism, such as, but not limited to, a diverter, a pusher, or an omni-directional wheel.

In embodiments, the lateral sorter 140 of the baggage vehicle 101 includes the diverter (not depicted). The diverter may pivot between one or more positions by an electronic or pneumatic drive. The diverter may then divert baggage from the conveyor to one or more secondary conveyors (e.g., secondary conveyor 502). The diverter may be pneumatic or electric. Furthermore, the diverter may be controlled by the controller 120, in accordance with one or more embodiments of the present disclosure. A diverter is described in U.S. Pat. No. 4,711,357, filed on Dec. 18, 1985, which is incorporated herein by reference in its entirety.

In embodiments, the lateral sorter 140 of the baggage vehicle 101 includes the pusher (not depicted) and the secondary conveyor 502. The secondary conveyor 502 may span a width of the storage areas 108. The pusher may be disposed above the secondary conveyor 502. The pusher may be actuated by any suitable mechanism, such as, but not limited to, a hydraulic actuator or a cam. The pusher may be controlled by the controller 120, in accordance with one or more embodiments of the present disclosure. The controller may actuate the pusher to push the baggage in a lateral direction along the secondary conveyor 502 (e.g., to push luggage between the laterally adjacent storage areas). A pusher is described in U.S. Pat. No. 6,837,359, filed on Feb. 17, 2004, which is incorporated herein by reference in its entirety.

The pusher may also be connected to the vertical sorter 114. In this regard the pusher may be raised with the secondary conveyor 502 as the secondary conveyor is raised (e.g., to the storage area 108). The pusher may then laterally sort the luggage by engaging the pusher and pushing the luggage laterally along the secondary conveyor. Alternatively, the pusher may be connected to the device by a connection other than to the vertical sorter (e.g., to the storage portion or to the exterior conveyor 102). In this regard, the pusher may remain stationary as the secondary conveyor 502 is changed to a height of the storage area 108 by the vertical sorter. The baggage may be laterally pre-sorted on the secondary conveyor 502 by the pusher before the height of the secondary conveyor 502 is changed.

In embodiments, the lateral sorter 140 of the baggage vehicle 101 includes any suitable mechanism for laterally sorting baggage between lateral storage areas 108. For example, the lateral sorter 140 may include an omni-directional wheel (not depicted).

In embodiments, the storage areas 108 of the baggage vehicle 101 may be associated with categories of items to be stored. For example, much of the present disclosure has discussed the storage of baggage in the storage areas 108. This is not intended as a limitation on the present disclosure. In this regard, baggage should be interpreted to include various cargo types, such as, but not limited to, general cargo, special cargo, freight, consumer baggage, or US mail.

Although the storage areas 108 has been described as including the storage area conveyors 112, this is not intended as a limitation on the present disclosure. For example, the storage area 108 may include one or more rollers (not depicted). In this regard, the baggage may be loaded into the storage area 108 and rolled into the rear of the storage area 108. The storage area 108 may then be unloaded by pushing and/or pulling the baggage along the rollers.

As depicted in FIG. 3A-5C, the baggage vehicle 101 may include three rows of vertically adjacent storage areas 108 with two columns of laterally adjacent storage areas 108 (totaling six storage areas). This depiction is not intended to be limiting. In this regard, the device may include any number of rows and columns of storage areas. Furthermore, the storage areas may include different sized storage areas (e.g., a double tall storage area, a double wide storage area, etc.). By including different sized storage areas, larger items may be stored by the device, such as skis or golf clubs.

In embodiments, the baggage vehicle 101 includes one or more sensors (not depicted). The sensors may be configured to identify the baggage (e.g., by an RFID tag, by a barcode, by a visual machine learning algorithm, etc.). The sensor may include any suitable sensor, such as, but not limited to, an RFID sensor, a barcode scanner, or a computer vision sensor (with a visual identifier). For example, the sensor may include a barcode scanner configured to scan a tag of the baggage. The tag may include a barcode of the baggage identification. The barcode may be stored in a database of baggage, the database including various data regarding the baggage, such as, but not limited to, an owner of the baggage, a destination of the baggage, flight details of the owner, a seat number of the owner, a priority of the baggage, a connecting time of the owner, a zip code of the owner, a color of the baggage, or a weight of the baggage. A baggage handler may scan the barcode or the baggage vehicle 101 may scan the barcode autonomously. Scan data may then be provided to the controller 120. The controller 120 may determine that the baggage should be stored in a storage area 108 based on the flight details (e.g., storage area 108a is currently being used for flights to Los Angeles). The controller 120 may then control the device autonomously to store the baggage in the appropriate storage area 108 by the vertical sorter 114 and the lateral sorter. Although the baggage vehicle 101 has been described as including a sensor, this is not intended as a limitation on the present disclosure. For example, the controller 120 may receive a baggage identifier by a communication with the server 128.

Although the baggage vehicle 101 is described with the home position being the bottom storage areas 108e, 108f, this is not intended as a limitation on the present disclosure. For example, the home position may be located on any lateral and vertical position of the device. The home position may be optimized to reduce a travel time between the home position and each of the storage areas. In this regard, a centralized home position may have a minimized travel time.

In embodiments, the baggage vehicle 101 may include one or more digital displays (e.g., LED, OLED and the like) formed/attached to one or more surfaces of the device (e.g., top surface) for message/advertising purposes.

Although the vertical sorter 114 has been described as vertically sorting baggage between one or more vertically adjacent storage areas (e.g., 108a-108f). This is not intended to be limiting. In this regard, vertical sorter 114 may be configured to vertically sort baggage within a single storage area 108 by a connection to the lateral sorter 140 (not depicted). For example, the storage area 108 may include a first baggage on a floor height of the storage area 108. The baggage vehicle 101 may then receive a second baggage. The vertical sorter 114 may raise the second baggage to a height which is above the first baggage (e.g., based on the height of the first baggage). The second baggage may then be placed on the first baggage by the lateral sorter 140.

The baggage vehicle 101 has been described as a baggage vehicle with a propulsion unit 134 to move the baggage vehicle 101 by one or more wheels 136. This is not intended as a limitation on the present disclosure. For example, the baggage vehicle 101 may be configured to couple with an exterior propulsion unit (not depicted), such as, but not limited to, a tug. The baggage vehicle 101 may be configured to couple in any suitable manner, such as, but not limited to, a pintle hitch trailer connection (not depicted). In this regard, the baggage vehicle 101 may be deployed to a baggage handling area by a baggage handler controlling the baggage vehicle 101 by the baggage tug.

The one or more processors of the control system may include any one or more processing elements known in the art. In general, the term "processor" may be broadly defined to encompass any device having one or more processing elements, which execute program instructions from a non-transitory memory medium. The one or more processors may include any microprocessor-type device configured to execute software algorithms and/or program instructions. In one embodiment, the one or more processors may be configured to execute a set of program instructions to carry out one or more steps described throughout the present disclosure. It should be recognized that the steps described throughout the present disclosure may be carried out by a single control system or, alternatively, multiple control systems. The memory may include any storage medium known in the art suitable for storing program instructions executable by the associated one or more processors of control system. For example, the memory may include, but is not limited to, a read-only memory, a random-access memory, a solid-state drive and the like. In another embodiment, it is noted herein that the memory is configured to store one or more results from the one or more of the various subsystems of the system.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device-detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively, or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A baggage vehicle comprising:
    a storage portion, the storage portion including a storage area, the storage area configured to receive a baggage;
    an exterior conveyor having a first and second end, the exterior conveyor configured to convey the baggage from the first end to the second end, the exterior conveyor configured to pivot about a pivotable connection to change an angle of the first end of the exterior conveyor relative to the ground, wherein the exterior conveyor comprises a telescoping exterior conveyor, wherein the exterior conveyor is configured in a transport configuration by pivoting about the pivotable connection and telescoping;
    a lateral sorter configured to receive the baggage from the second end of the exterior conveyor and adjust a lateral position of the baggage;
    a vertical sorter configured to adjust a vertical position of the baggage by adjusting a vertical position of the lateral sorter; and
    a controller communicatively coupled to the exterior conveyor, the lateral sorter, and the vertical sorter, the controller including one or more processors and memory, wherein the one or more processors are configured to execute a set of program instructions maintained in the memory, wherein the set of program instructions are configured to cause the one or more processors to:
        receive a baggage identifier associated with the baggage;
        direct the exterior conveyor to convey the baggage from the first end to the second end in response to receiving the baggage identifier;
        direct the vertical sorter to adjust the vertical position of the baggage; and
        direct the lateral sorter to adjust the lateral position of the baggage.

2. The baggage vehicle of claim 1, further comprising:
    a storage area conveyor spanning a length of the storage area, the storage area conveyor configured to convey the baggage from a front of the storage area to a rear of the storage area,
    wherein the controller is communicatively coupled to the storage area conveyor, wherein the set of program instructions are further configured to cause the one or more processors to engage the storage area conveyor.

3. The baggage vehicle of claim 2, wherein the lateral sorter is configured to receive the baggage from the storage area by the storage area conveyor,
    wherein the lateral sorter is configured to adjust a lateral position of the baggage for conveying the baggage from the second end of the exterior conveyor to the first end of the exterior conveyor for unloading the baggage from the baggage vehicle.

4. The baggage vehicle of claim 1, wherein the baggage identifier is received from at least one of an RFID reader or a barcode reader.

5. The baggage vehicle of claim 1, wherein the storage portion includes a plurality of vertical and lateral storage areas,
    wherein the vertical sorter is configured to adjust a vertical position of the baggage to sort the baggage between the vertical storage areas, wherein the lateral sorter is configured to adjust a lateral position of the baggage to sort the baggage between the lateral storage areas.

6. The baggage vehicle of claim 5, wherein the controller is configured to engage the vertical sorter to adjust the vertical position of the baggage based on the baggage identifier,
wherein the controller is configured to engage the lateral sorter to adjust a lateral position of the baggage based on the baggage identifier.

7. The baggage vehicle of claim 6, wherein the baggage identification is associated with at least one of a weight of the baggage, one or more dimensions of the baggage, a destination of the baggage, a flight of the baggage, or an owner of the baggage.

8. The baggage vehicle of claim 6, wherein the lateral sorter includes a plurality of directional conveyors, the plurality of directional conveyors configured to adjust at least one of the lateral position of the baggage or the orientation of the baggage, wherein the orientation of the baggage is adjusted by varying a speed one or more of the plurality of directional conveyors.

9. The baggage vehicle of claim 6, wherein the lateral sorter includes a secondary conveyor connected to a horizontal stage, wherein the horizontal stage is configured to translate the secondary conveyor in a lateral direction between the lateral storage areas.

10. The baggage vehicle of claim 6, wherein the lateral sorter includes at least one of a diverter or a pusher.

11. The baggage vehicle of claim 1, further comprising a propulsion unit configured to move the baggage vehicle by one or more wheels.

12. The baggage vehicle of claim 11, wherein the controller is communicatively coupled to the propulsion unit, wherein the program instructions are further configured to cause the one or more processors to engage the propulsion unit to autonomously control the baggage vehicle.

13. The baggage vehicle of claim 12, wherein the program instructions autonomously control the baggage vehicle based on at least one of a global positioning data or one or more vehicle sensors.

14. The baggage vehicle of claim 1, further comprising a rear opening disposed at a rear end of the storage area, wherein the storage area is configured to be loaded and unloaded by the rear opening.

15. The baggage vehicle of claim 1, comprising a frame connected to the storage portion, wherein the pivotable connection is between the exterior conveyor and the frame such that the vertical sorter does not adjust a vertical position of the exterior conveyor when adjusting a vertical position of the lateral sorter, wherein the second end of the exterior conveyor remains at a fixed height while the first end of the exterior conveyor is raised and lowered by pivoting about the pivotable connection.

16. The baggage vehicle of claim 1, wherein the pivotable connection is between the lateral sorter and the storage portion, wherein the vertical sorter is further connected to the exterior conveyor for adjusting a height of the first end and the second end of the exterior conveyor.

17. A baggage vehicle comprising:
a storage portion, the storage portion including a plurality of storage areas configured to receive a baggage;
an exterior conveyor having a first and second end, the exterior conveyor configured to convey the baggage from the first end to the second end;
a lateral sorter configured to laterally sort the baggage between the plurality of storage areas;
a vertical sorter configured to vertically sort the baggage between the plurality of storage areas by adjusting a height of the lateral sorter; and
a plurality of wheels configured to support a weight of the storage portion;
wherein the exterior conveyor is configured to pivot about a pivotable connection to change an angle of the first end of the exterior conveyor relative to the ground, wherein the exterior conveyor comprises a telescoping exterior conveyor, wherein the exterior conveyor is configured in a transport configuration by pivoting about the pivotable connection and telescoping.

18. The baggage vehicle of claim 17, wherein at least one of the plurality of storage areas include a storage area conveyor.

19. The baggage vehicle of claim 17, further comprising a rear opening and a door covering the rear opening, wherein the plurality of storage areas includes a first storage area, the rear opening disposed at a rear of the first storage area, wherein the first storage area may be configured to load and unload the baggage through the rear opening.

20. The baggage vehicle of claim 17, wherein the exterior conveyor is configured to convey the baggage from the first end to the second end by at least one of a conveyor belt, power roller conveyor, an omni-directional conveyor, or a chain conveyor.

21. The baggage vehicle of claim 17, wherein the exterior conveyor is configured to pivot about the pivotable connection by at least one of a rotary actuator, a linear actuator, a hydraulic lift, a pneumatic lift, or a cable winch.

22. The baggage vehicle of claim 17, wherein the pivotable connection is between the lateral sorter and the storage portion, wherein the vertical sorter is further connected to the exterior conveyor for adjusting a height of the first end and the second end of the exterior conveyor.

23. The baggage vehicle of claim 22, wherein when the height of the second end of the exterior conveyor is adjusted by the vertical sorter, the controller causes the first end of the exterior conveyor to be at a fixed height by telescoping the exterior conveyor and pivoting the exterior conveyor about the pivotable connection.

24. The baggage vehicle of claim 17, wherein the lateral sorter includes a secondary conveyor connected to a horizontal stage, wherein the horizontal stage is configured to translate the secondary conveyor in a lateral direction between the lateral storage areas.

25. The baggage vehicle of claim 17, wherein the lateral sorter includes a plurality of directional conveyors.

26. The baggage vehicle of claim 17, wherein the lateral sorter includes at least one of a diverter or a pusher.

27. The baggage vehicle of claim 17, further comprising a propulsion unit connected to the plurality of wheels, the propulsion unit configured to selectively rotate the plurality of wheels to move the baggage vehicle.

28. A baggage handling system, comprising:
a server including a database of a plurality of baggage identifiers, the plurality of baggage identifiers including an associated flight and baggage weight; and
a baggage vehicle comprising:
a plurality of wheels;
a propulsion unit configured to selectively engage the plurality of wheels to move the baggage vehicle;
a storage portion, the storage portion including a storage area;
an exterior conveyor having a first end and a second end, the exterior conveyor configured to convey the baggage from the first end to the second end, the exterior conveyor configured to pivot about a pivotable connection to change an angle of the first end of the exterior conveyor relative to the ground, wherein the exterior conveyor comprises a telescoping exterior conveyor, wherein the exterior conveyor is configured in a transport configuration by pivoting about the pivotable connection and telescoping;

a lateral sorter configured to receive the baggage from the second end of the exterior conveyor and adjust a lateral position of the baggage;

a vertical sorter configured to adjust a vertical position of the baggage by adjusting a vertical position of the lateral sorter; and a controller communicatively coupled to the server by a network connection, the controller including one or more processors and memory, wherein the one or more processors are configured to execute a set of program instructions maintained in the memory, wherein the set of program instructions are configured to cause the one or more processors to:

receive a baggage identifier associated with a baggage;

provide the baggage identifier to the server by the network connection;

receive the flight and baggage weight of the baggage associated with the baggage identifier;

autonomously sort the baggage to the storage area; and autonomously drive the baggage vehicle.

29. The baggage handling system of claim 28, further comprising a secondary device communicatively coupled to the server by the network connection.

30. The baggage handling system of claim 29, wherein the secondary device includes at least one of a conveyor, a diverter, an additional baggage vehicle, or a baggage tug.

* * * * *